July 24, 1956  L. L. MATTHEWS ET AL  2,756,050
FEEDING-AND-STACKING METHOD AND MACHINE
Filed July 21, 1952  21 Sheets-Sheet 12
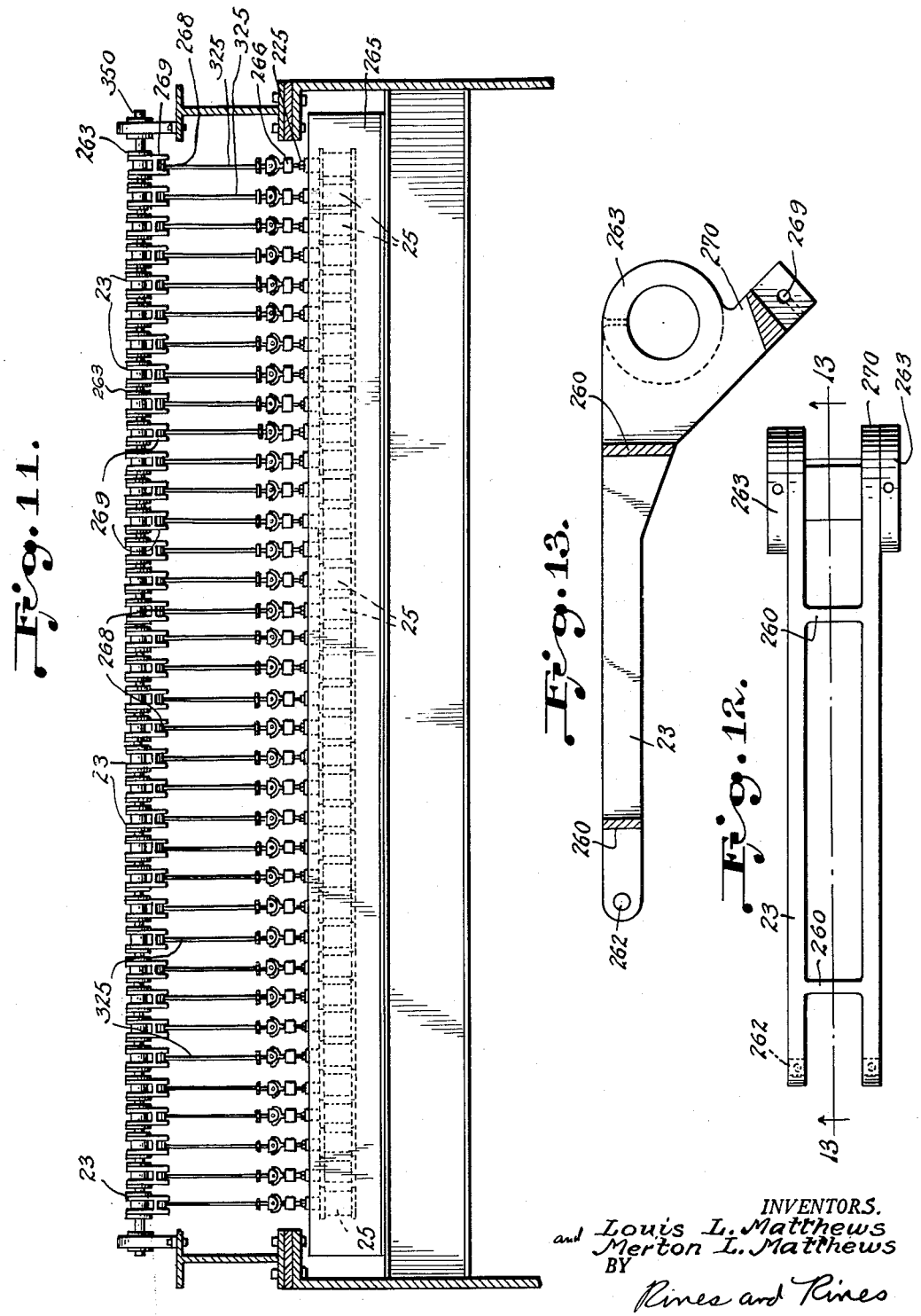
INVENTORS.
Louis L. Matthews
and Merton L. Matthews
BY
Rines and Rines
ATTORNEYS.

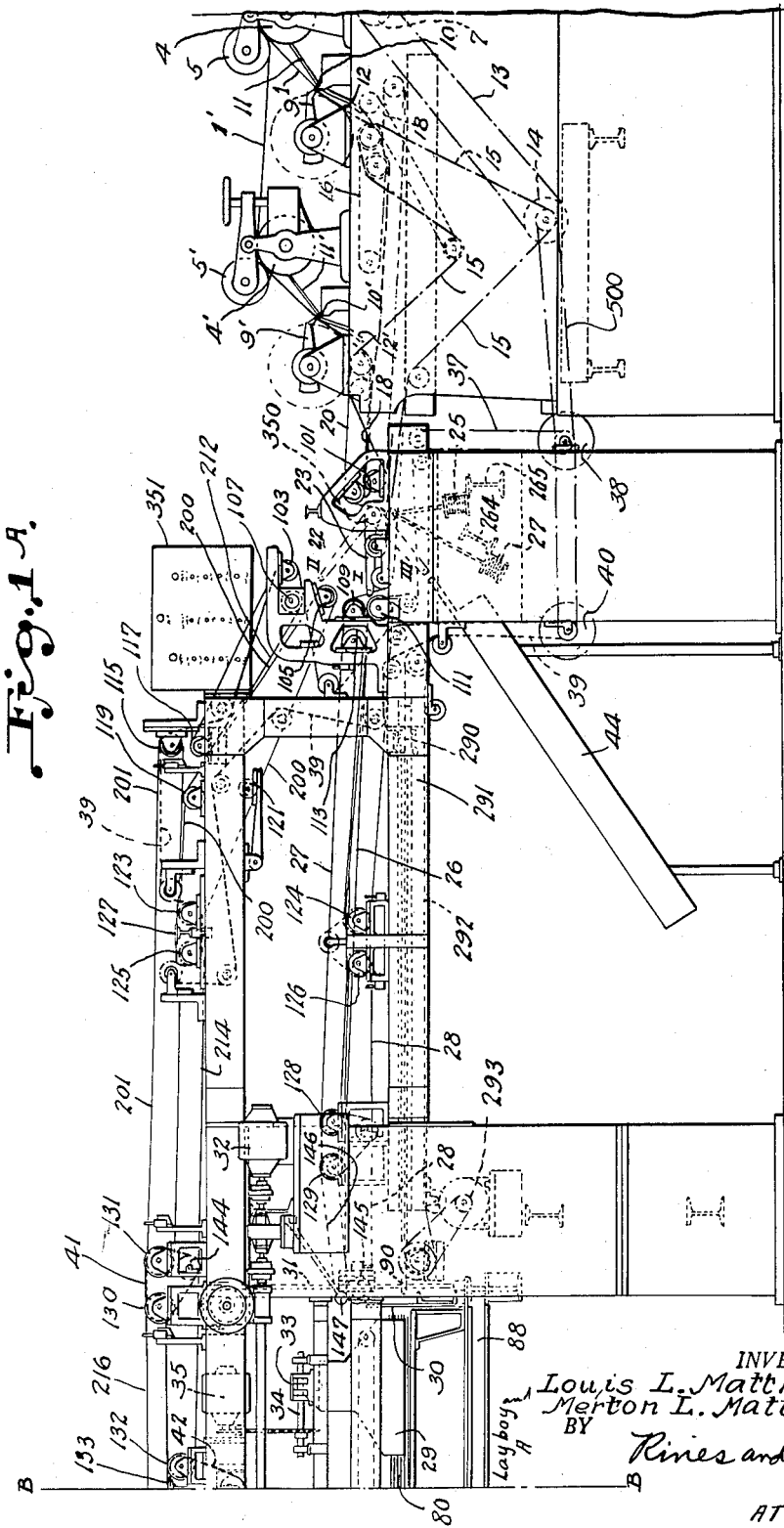

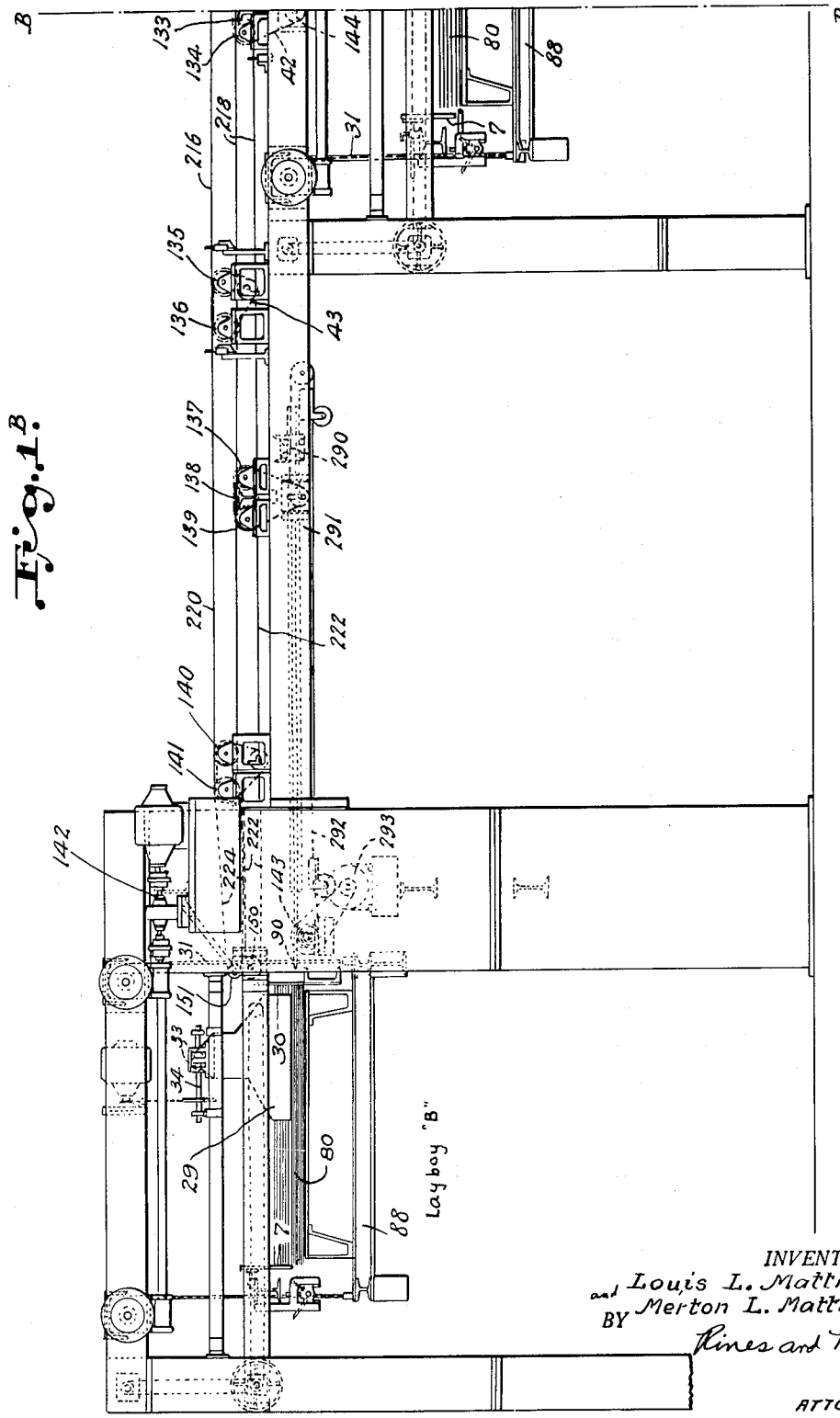

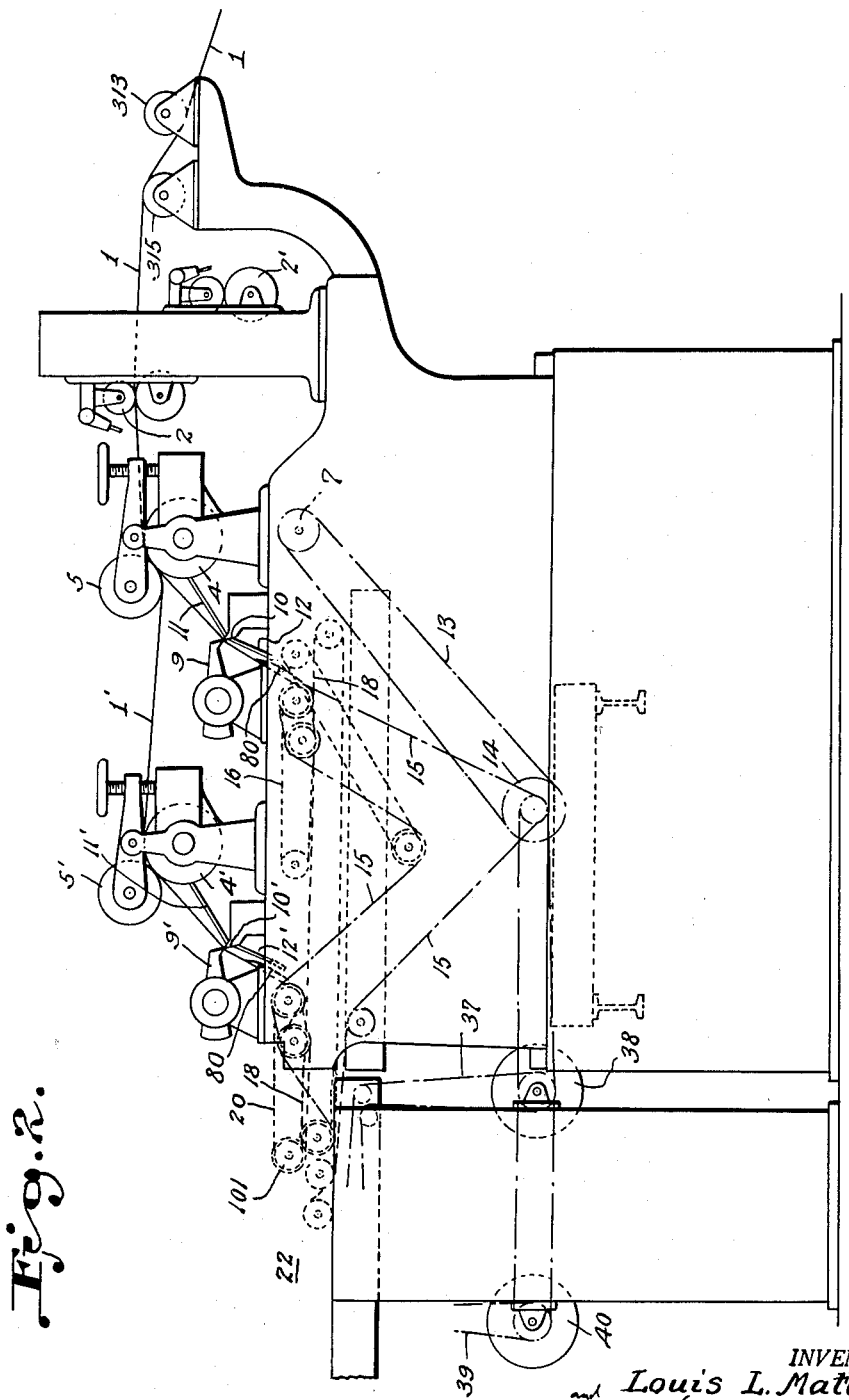

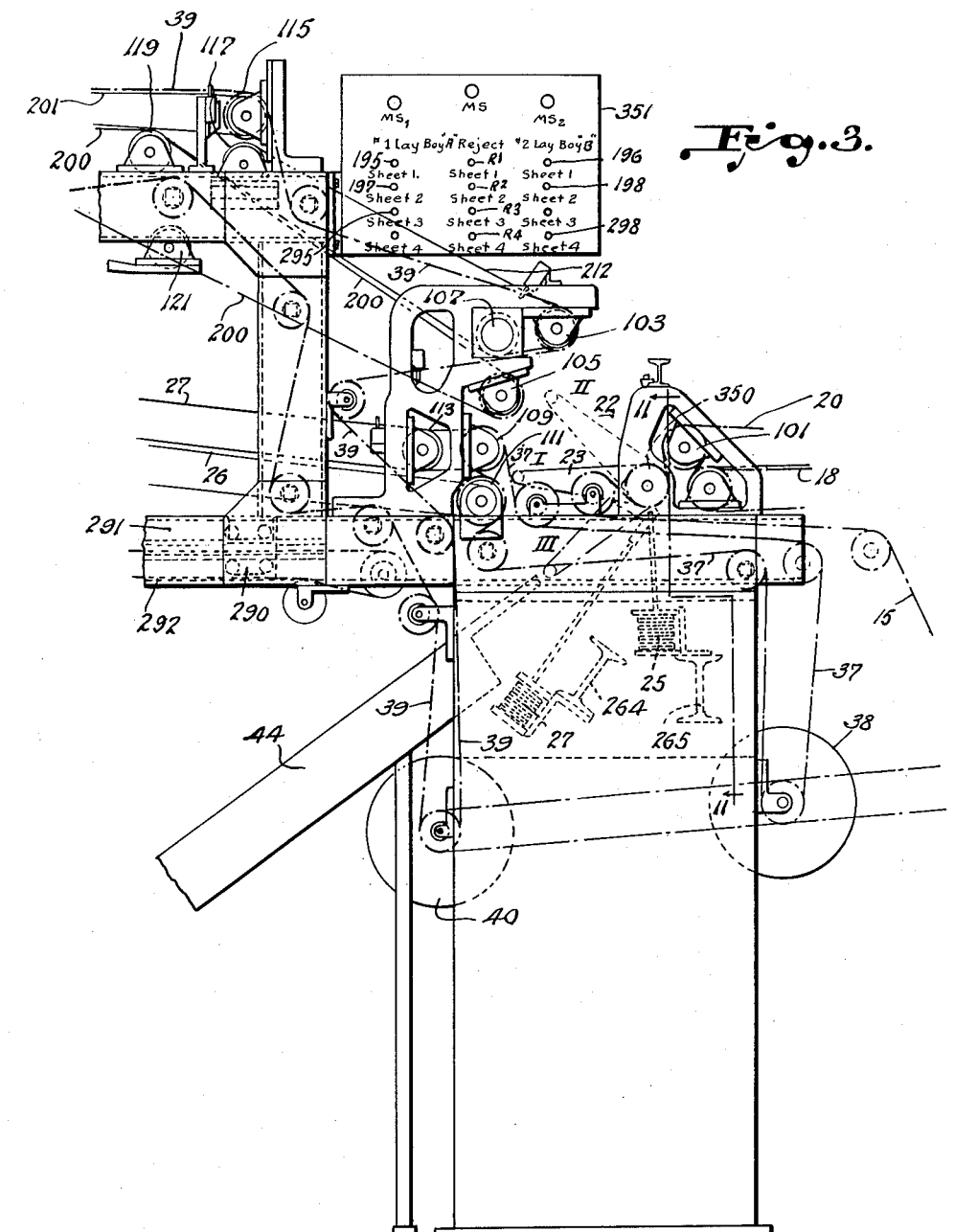

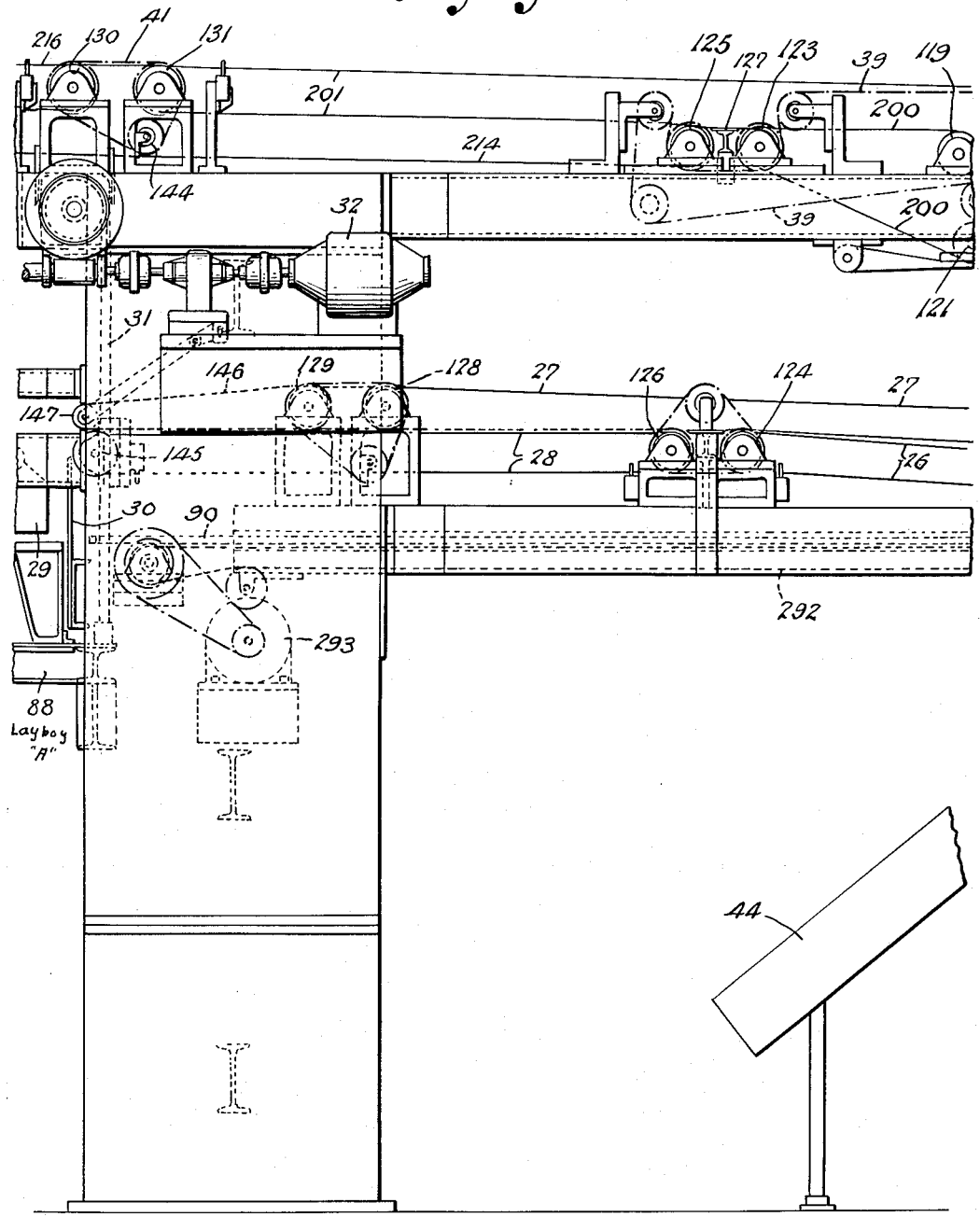

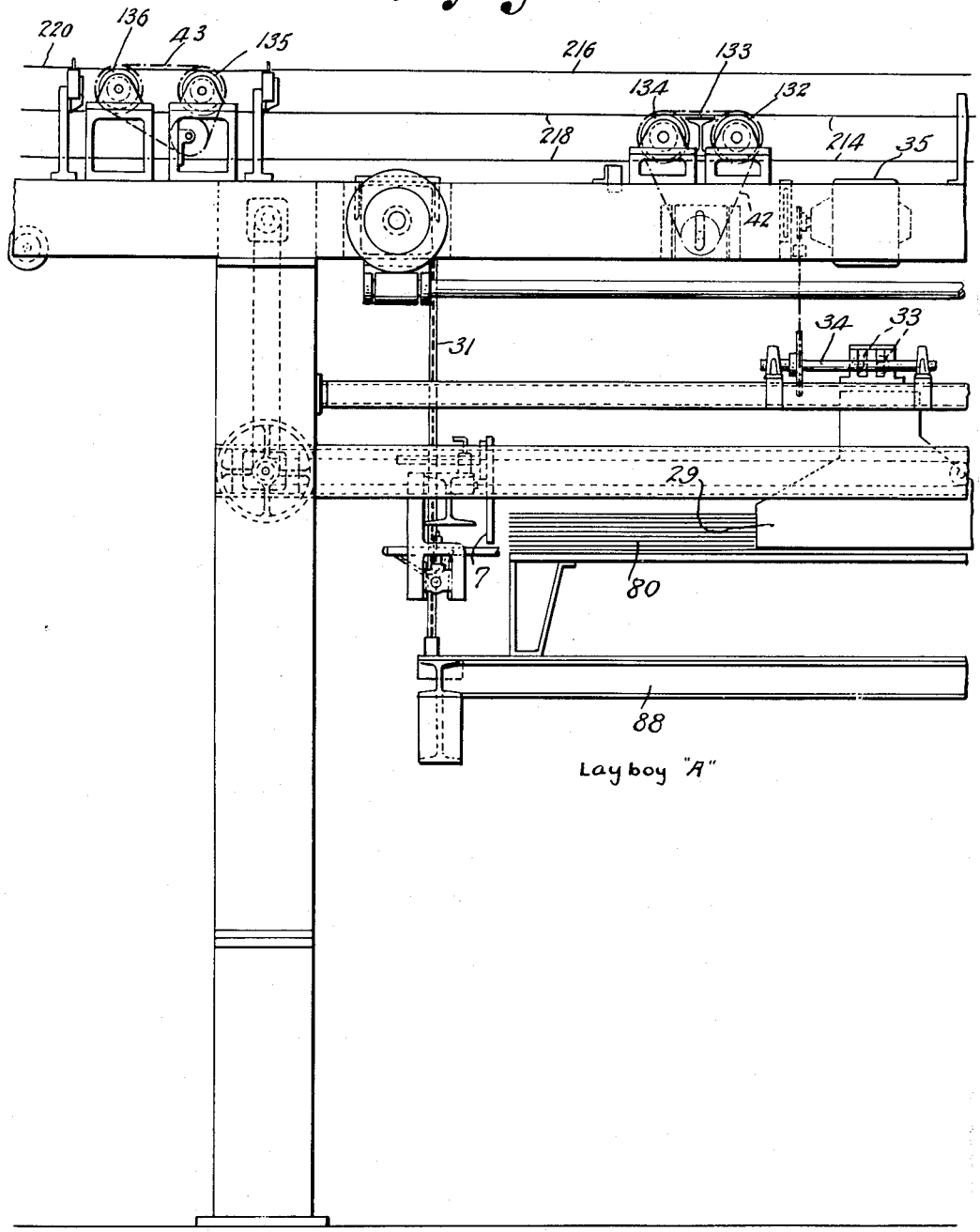

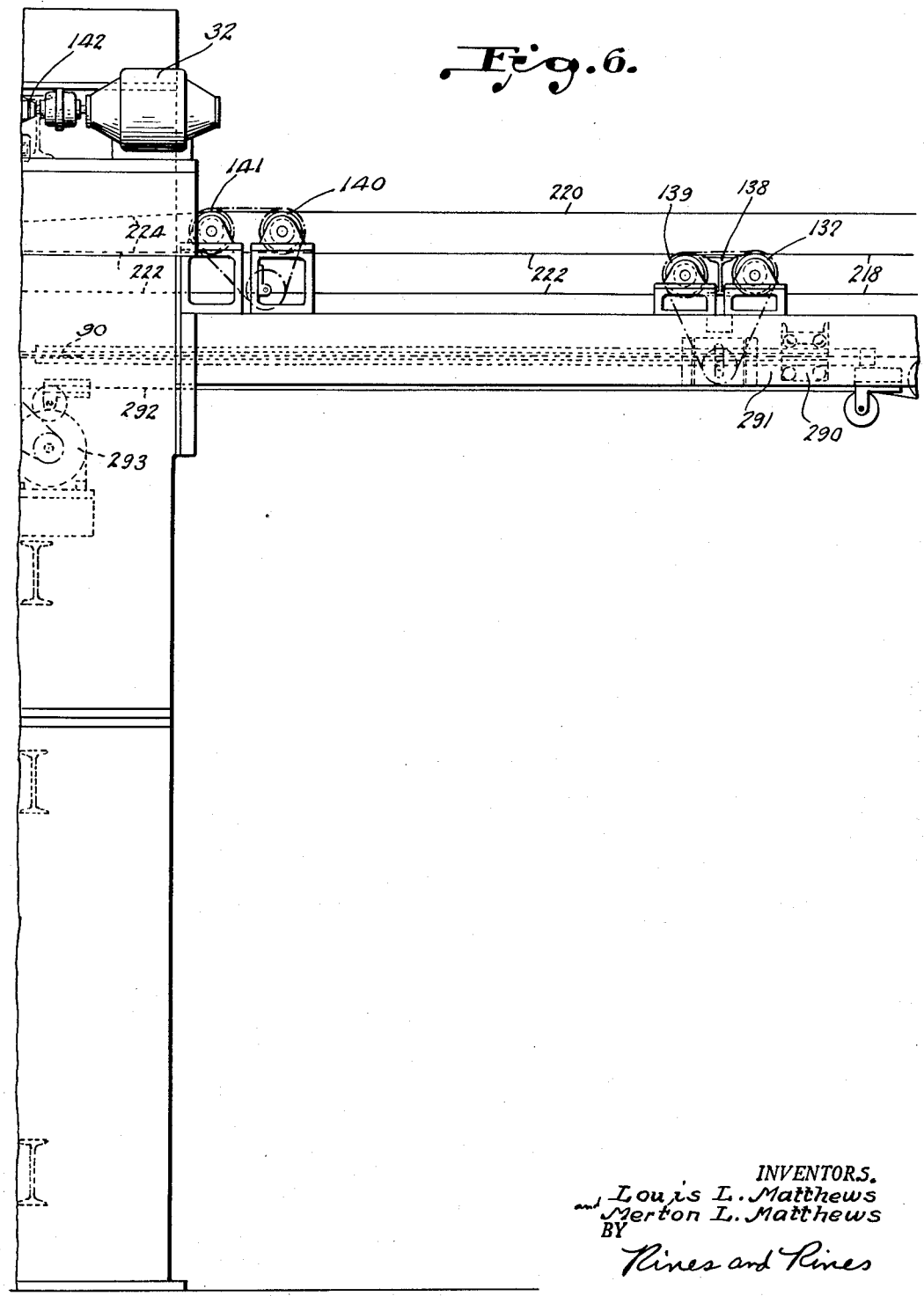

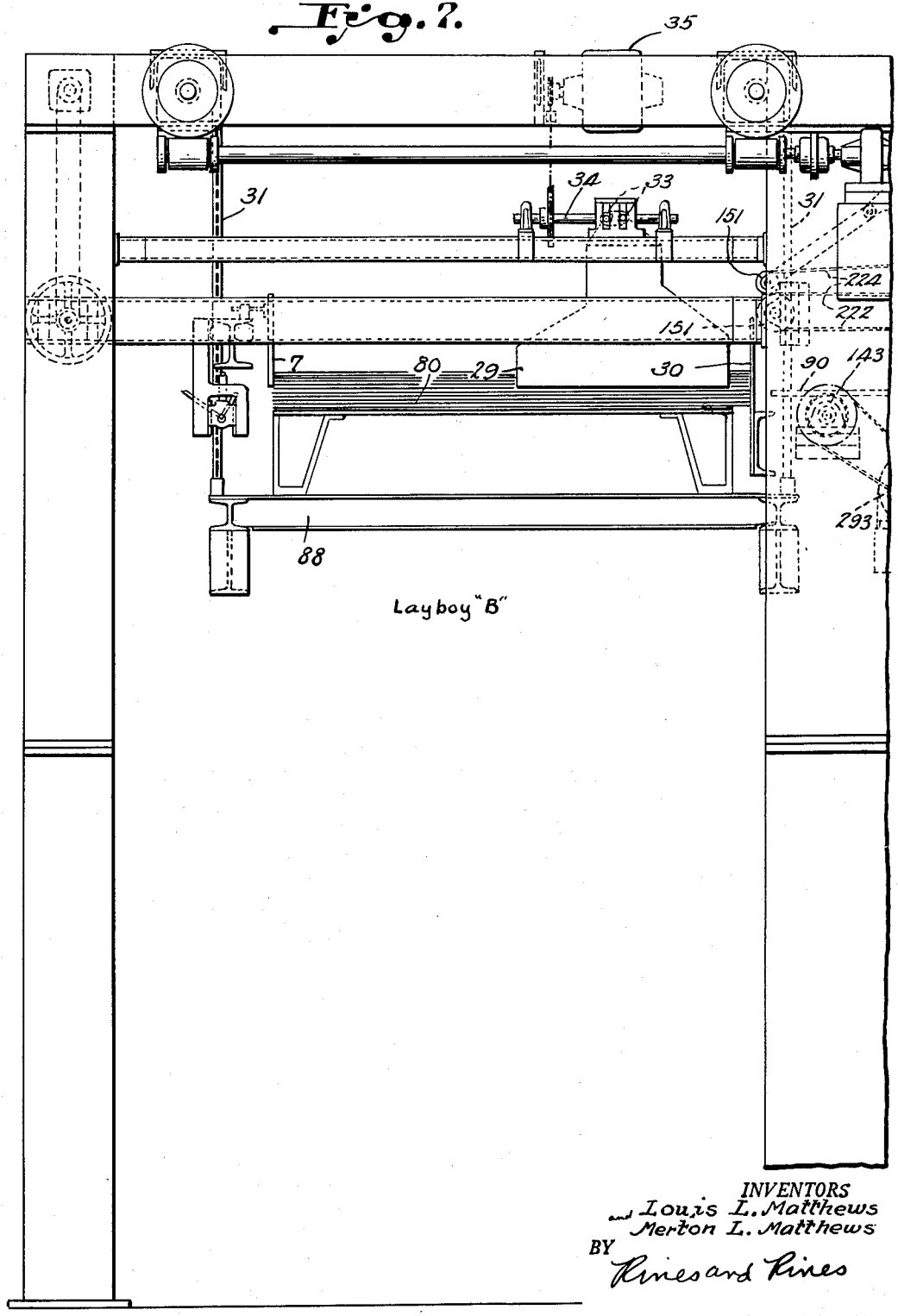

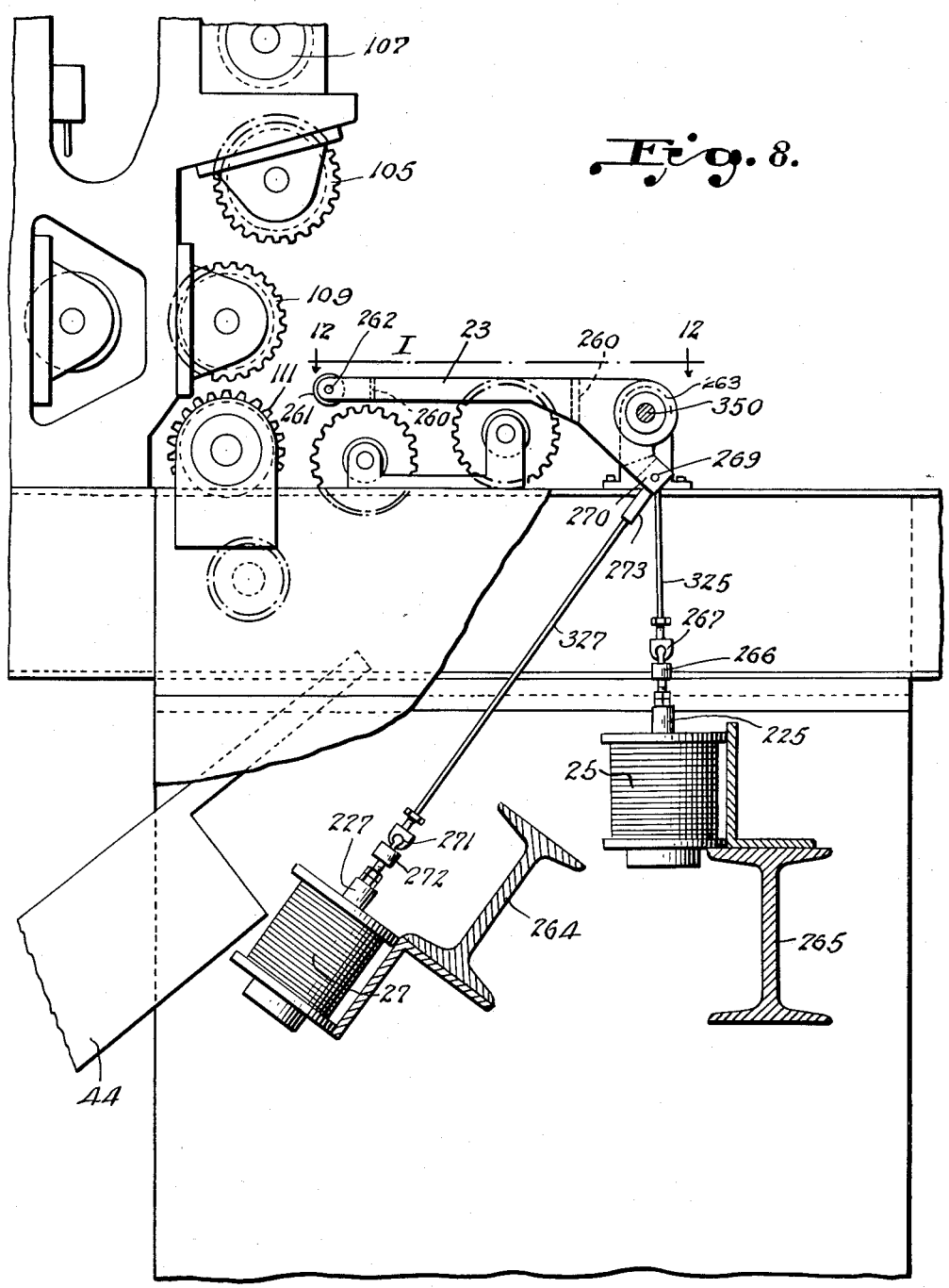

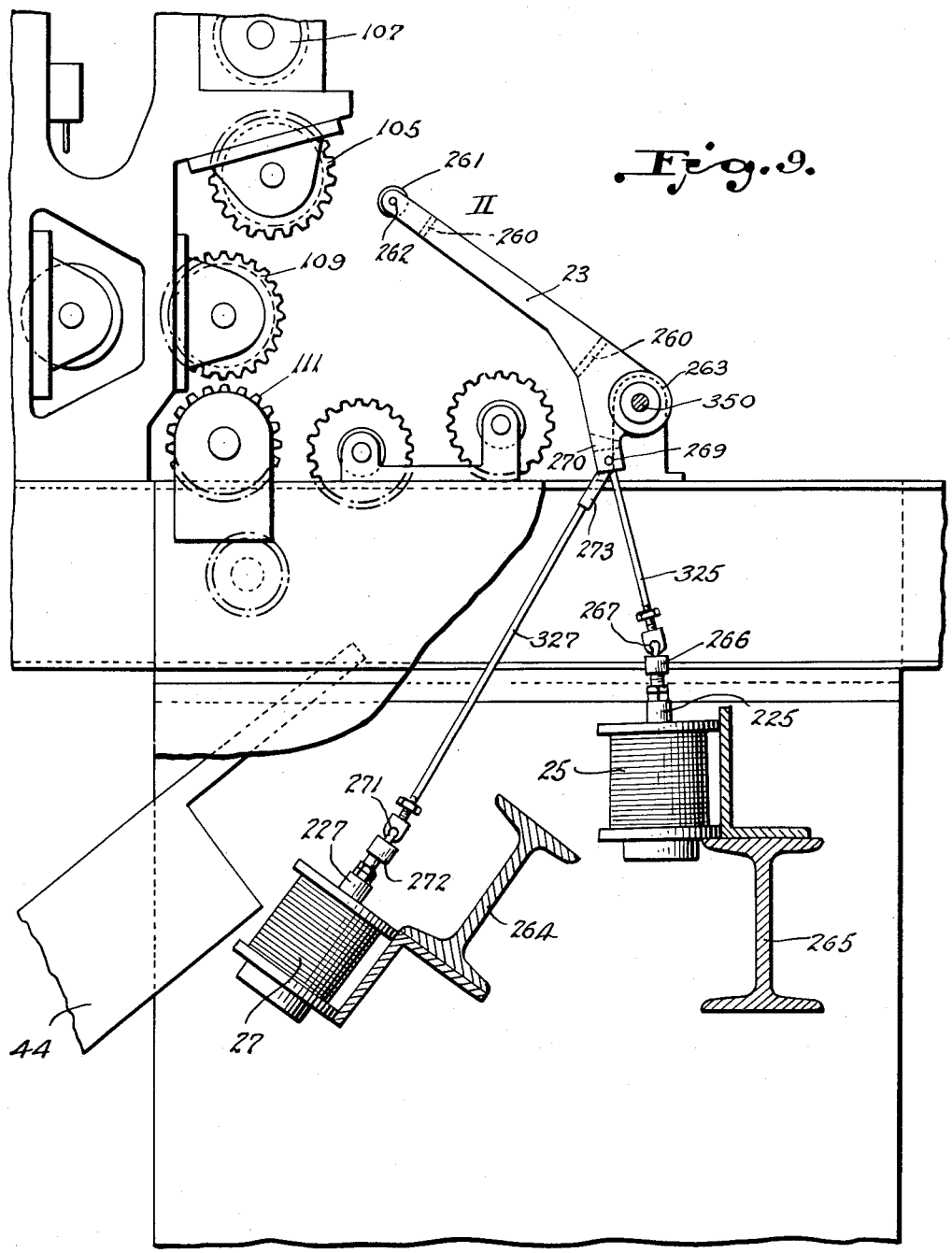

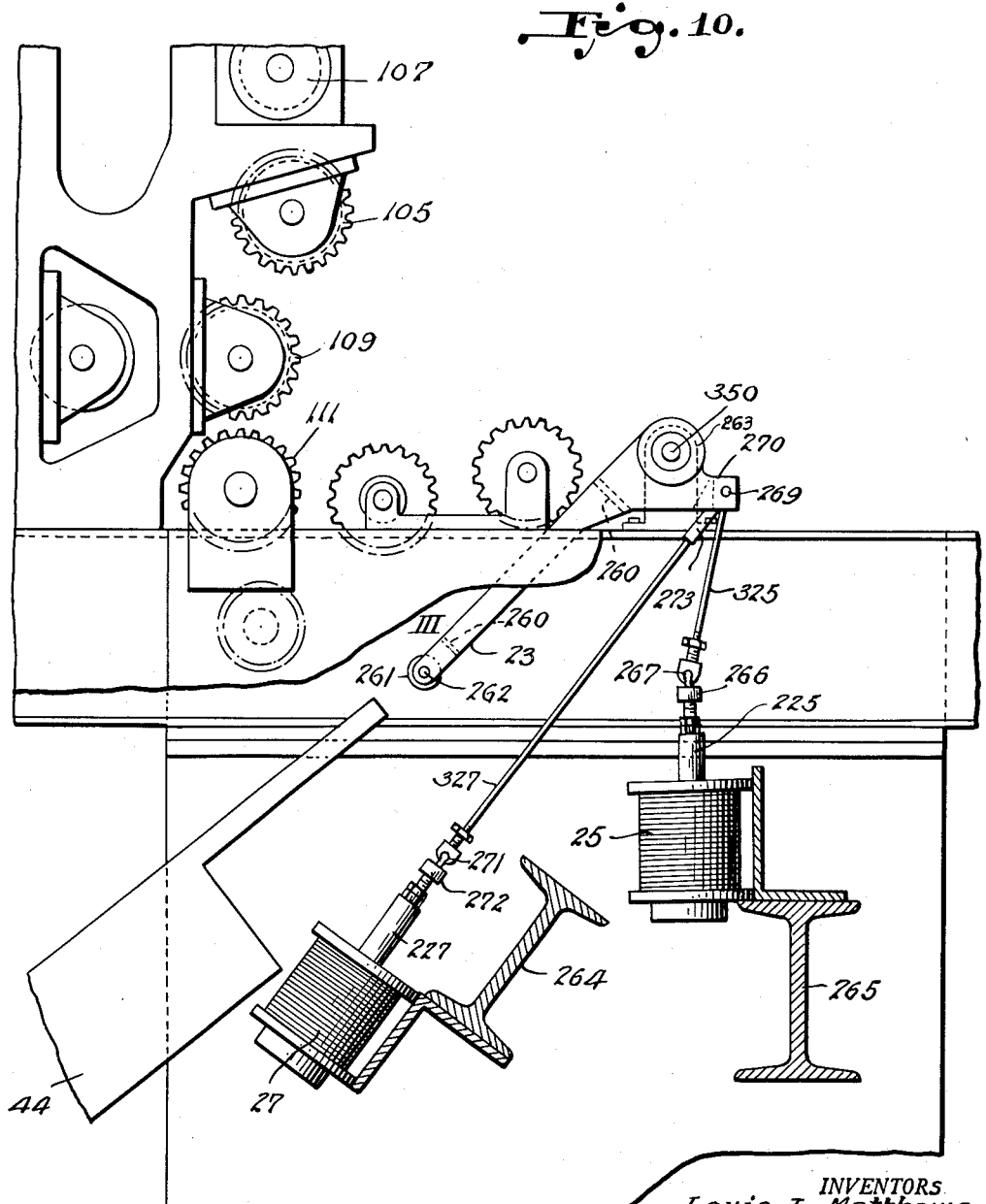

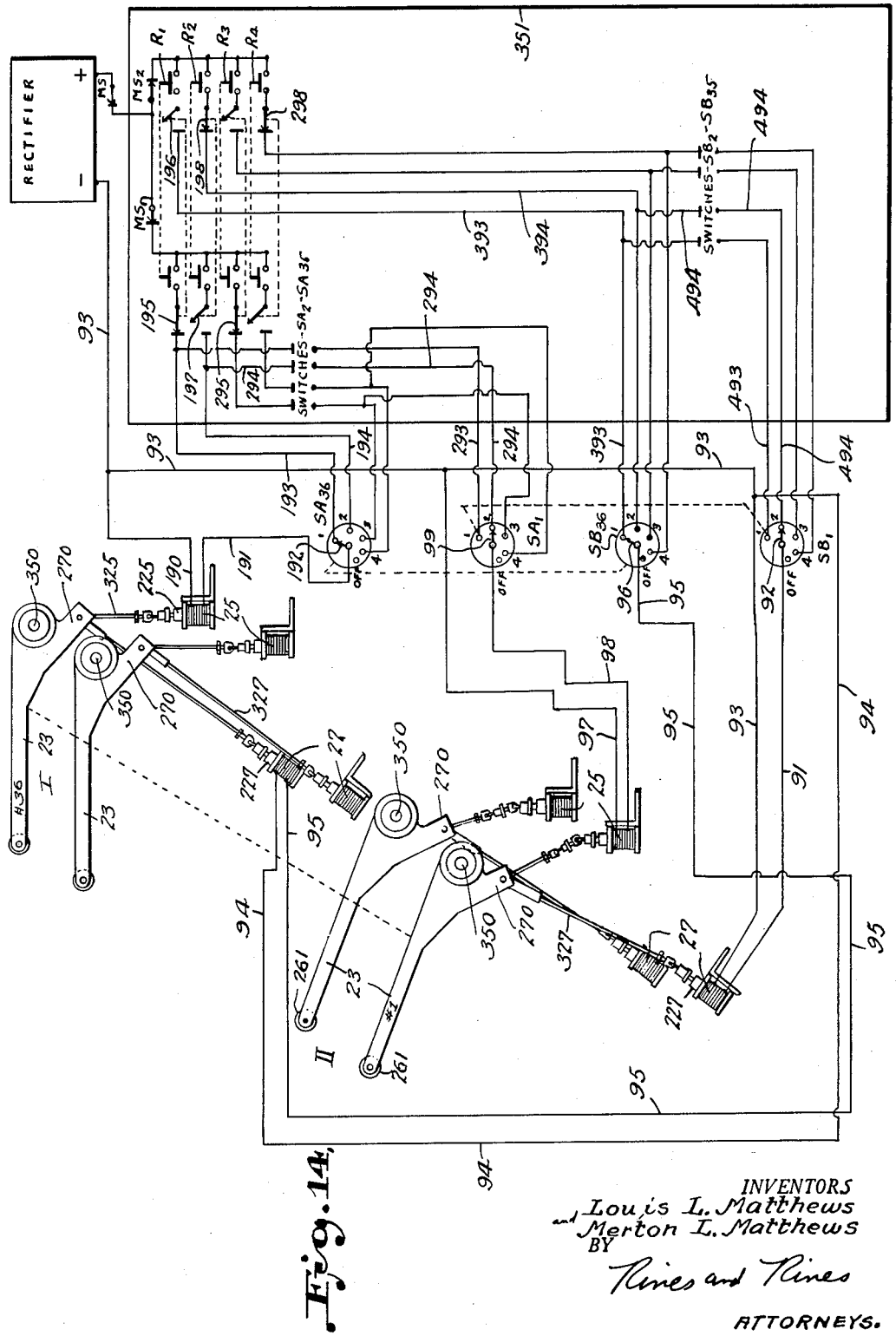

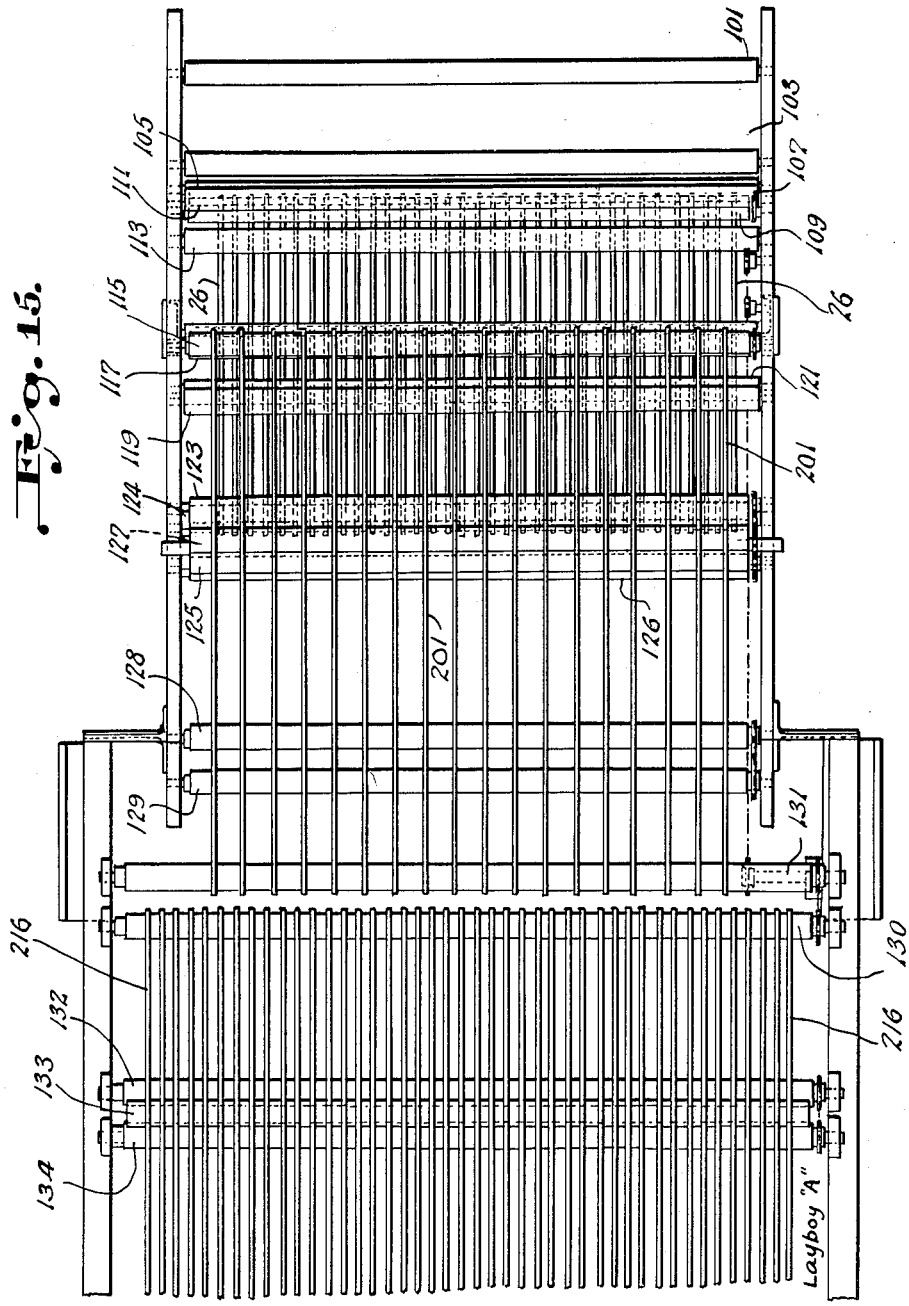

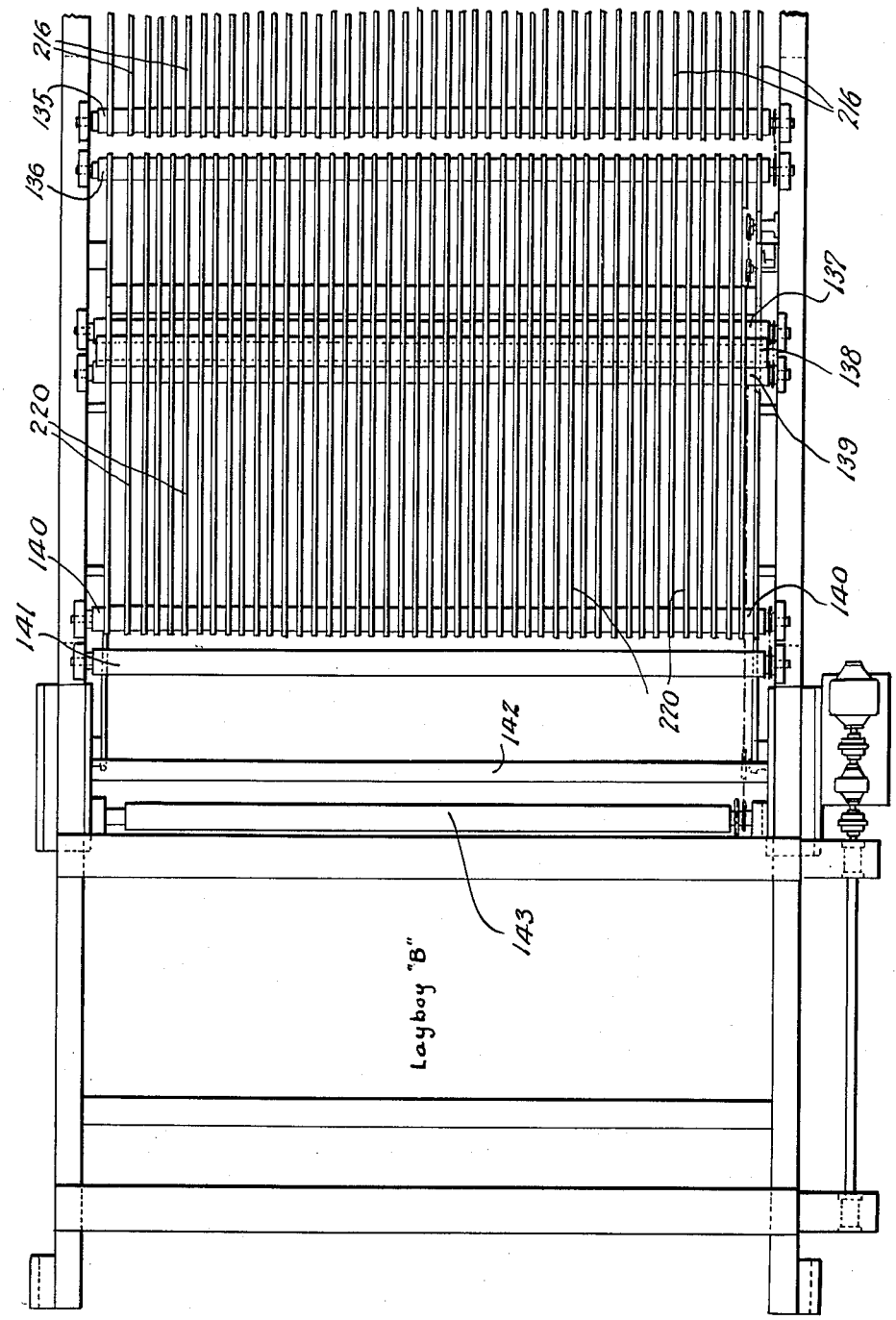

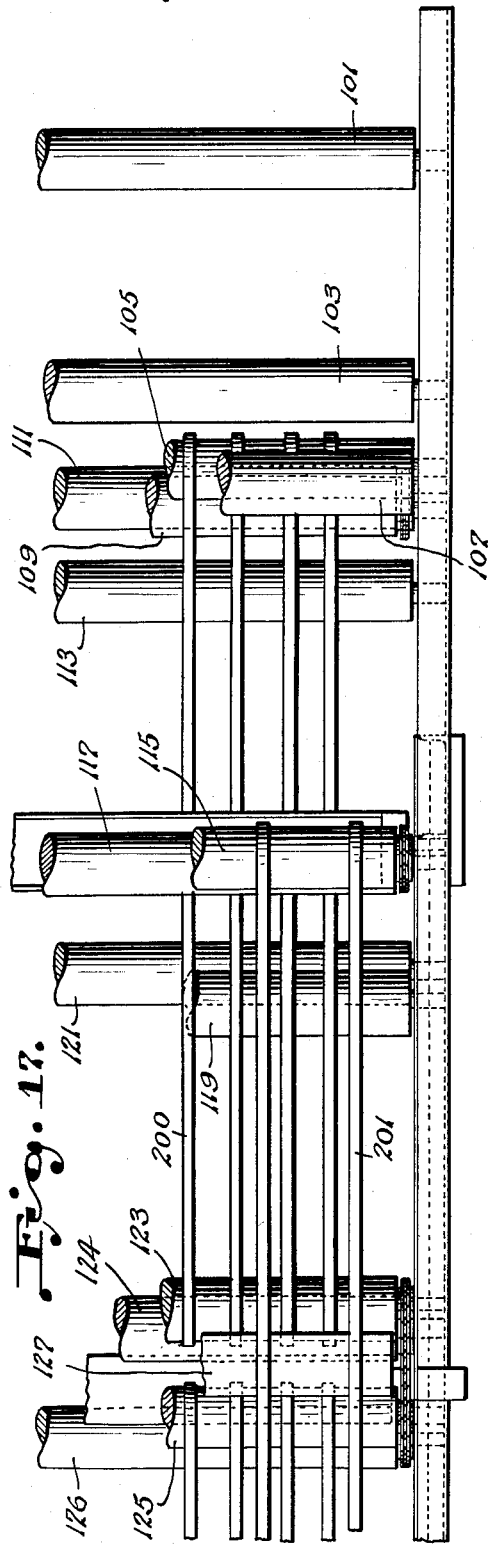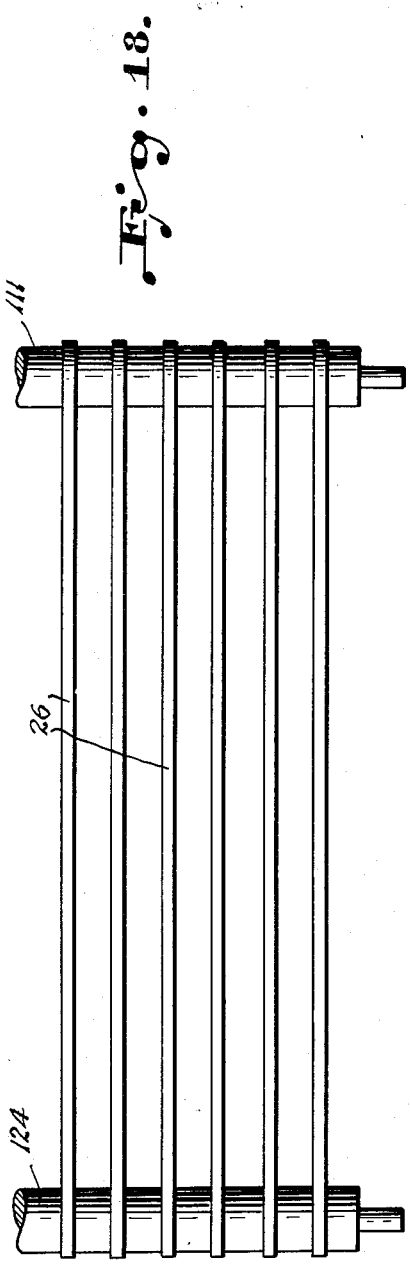

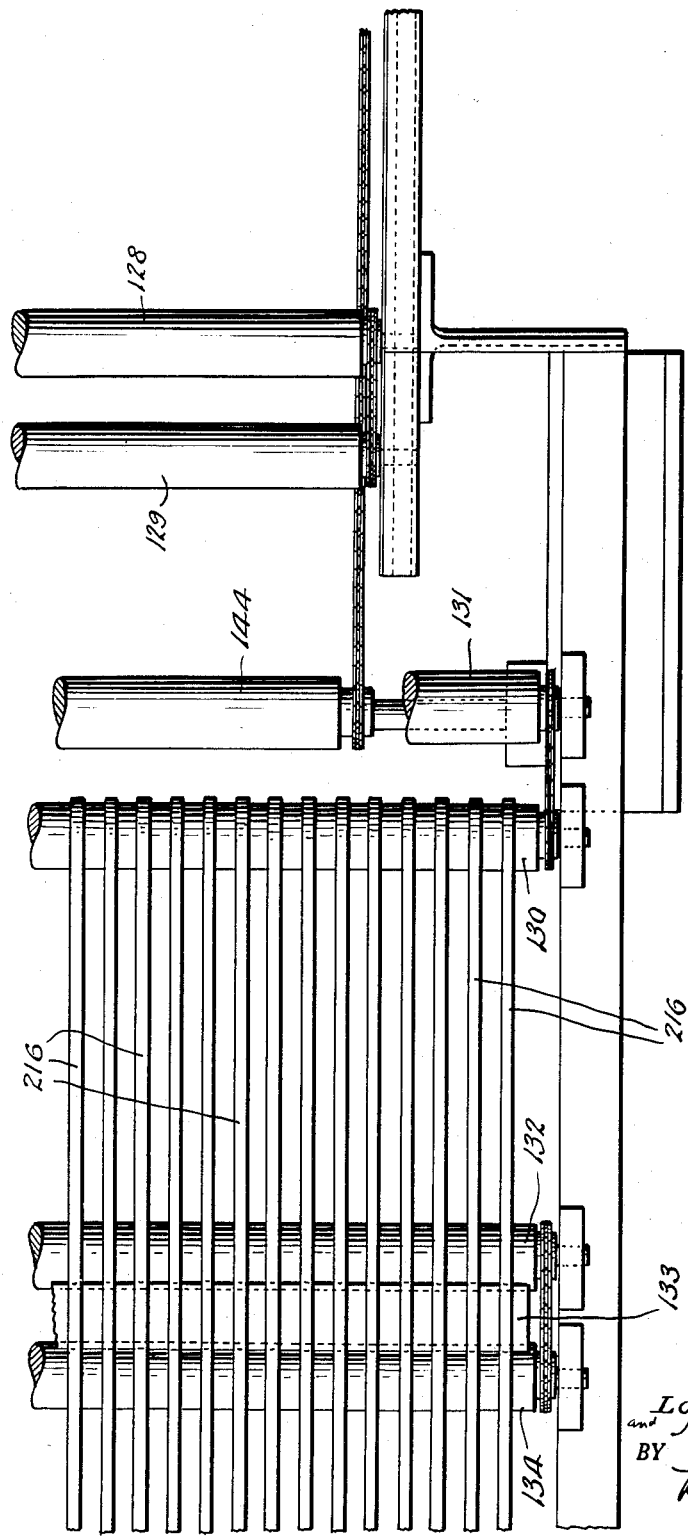

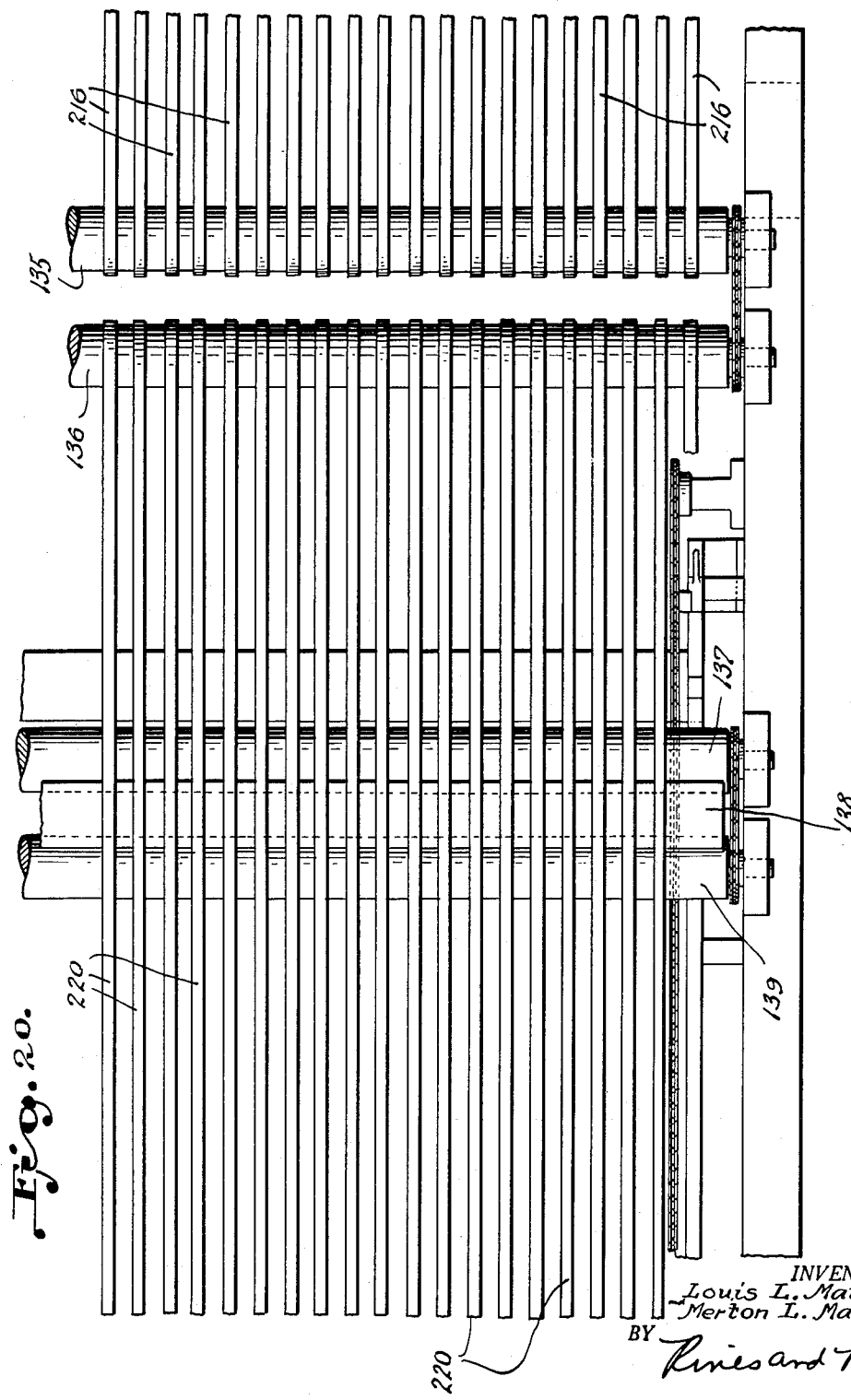

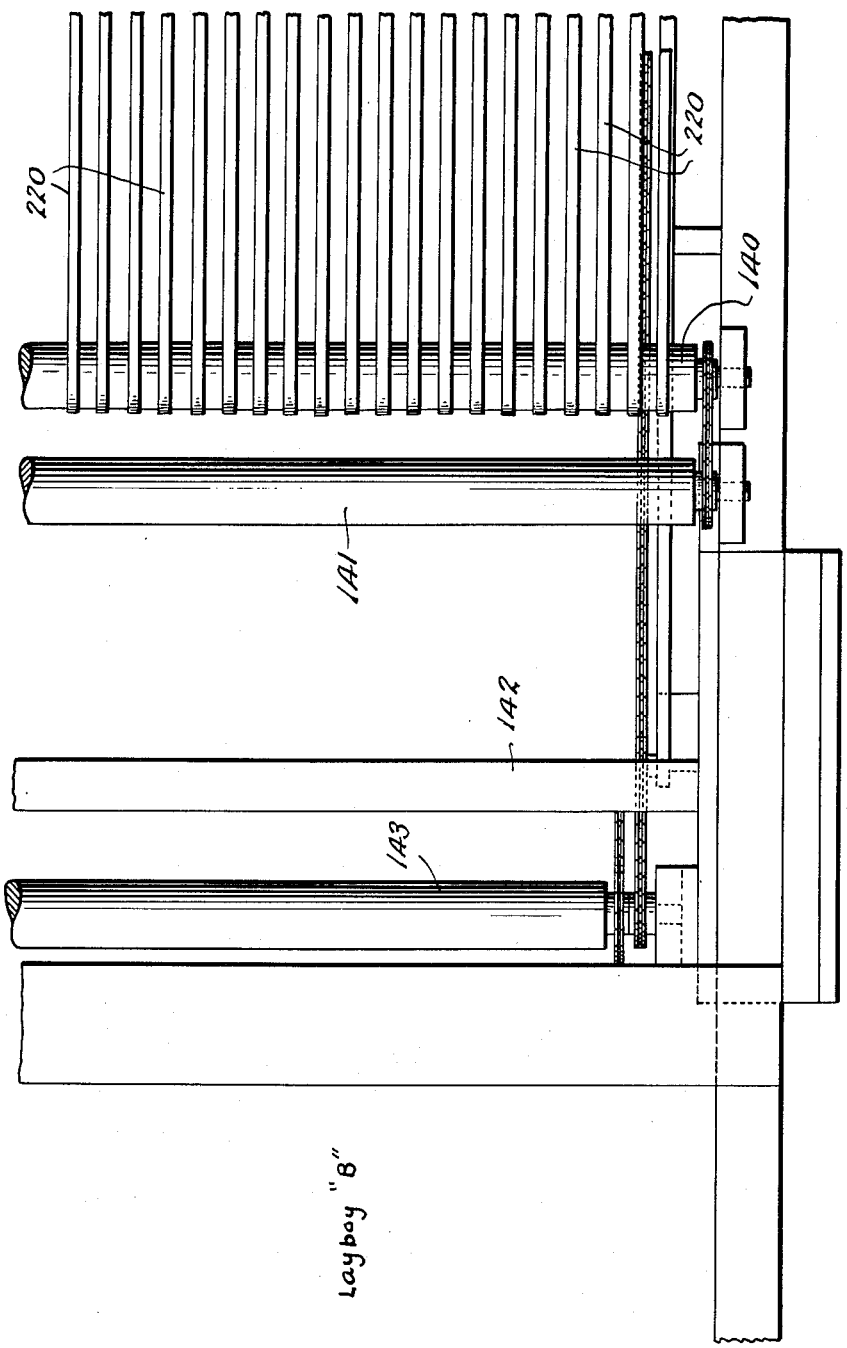

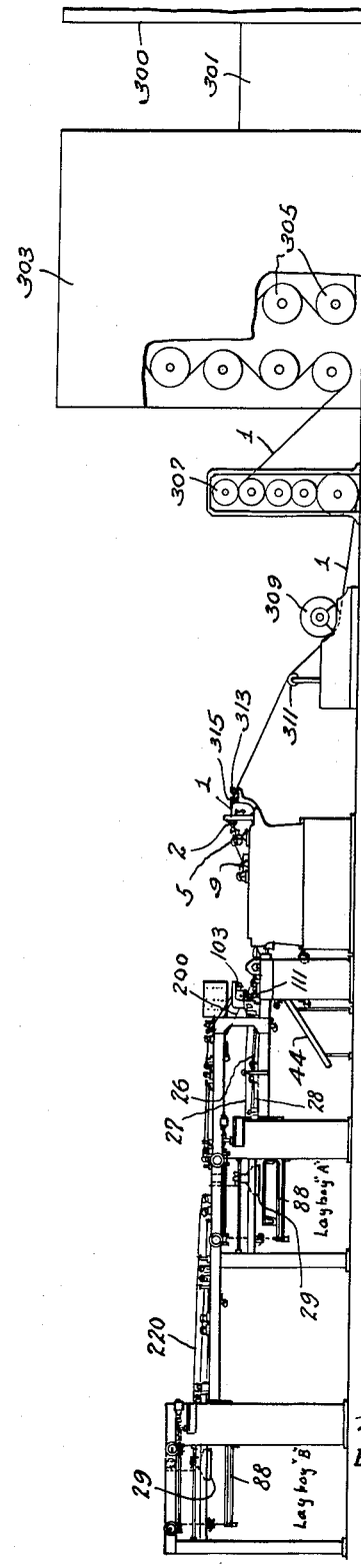

Fig. 23.

United States Patent Office 2,756,050
Patented July 24, 1956

2,756,050

FEEDING-AND-STACKING METHOD AND MACHINE

Louis L. Matthews and Merton L. Matthews, Westerly, R. I., assignors to Maxson Automatic Machinery Company, Westerly, R. I., a corporation of Rhode Island Application July 21, 1952, Serial No. 299,984

23 Claims. (Cl. 271—64)

The present invention relates to feeding-and-stacking methods and machines, and more particularly to methods of and machines for feeding and stacking sheet material, like paper or board.

A machine of the above-described character in common use comprises a plurality of tapes for feeding the sheets into a lay-boy, where they become stacked upon a main support. The main support is automatically lowered by degrees to maintain the top of the stack of sheets at substantially constant height, thereby permitting the feeding means to continue feeding the sheets into the lay-boy on top of the stack without hindrance from the sheets already there. When the main support becomes lowered to the floor, however, it becomes necessary to remove it, and to substitute therefor a new main support on which to stack further sheets. It is essential, at such times, either to shut down the machine, so as to prevent the feeding of further sheets into the lay-boy or else, as where high-speed production is required, to provide some mechanism that renders it unnecessary to interrupt the continuous feeding of the sheets.

According to the invention disclosed in United States Letters Patent 2,521,075, issued on September 5, 1950, to Louis L. Matthews, the problem is solved with the aid of an auxiliary support on which temporarily to stack the sheets during the removal of the completed stack on the main support and the substitution therefor of a new main support, after which the sheets temporarily stacked on the auxiliary support must be transferred to the substituted main support. This solution of the problem has proved to be very efficient, enabling the feeding and stacking of sheets of any practical length, of any weight stock.

An alternative solution of the problem of maintaining continuous operation of the machine during the removal of the completed stack of sheets is disclosed in United States Letters Patent 2,576,956, issued on December 4, 1951, to the said Louis L. Matthews, according to which a switching mechanism is provided for switching overlapped sheets from one path of travel to another path during the continuous operation of the machine. This system, too, has worked most efficiently in practice.

The systems disclosed in the said Letters Patent, however, require that all of the sheet material disposed laterally along the tapes be simultaneously operated upon in the same manner. In the system of the said Letters Patent 2,521,075, for example, the auxiliary support and the main support receive all of the sheet material disposed between the side edges of the tapes. Similarly, the switching mechanism of the system of the said Letters Patent 2,576,956 alters the direction of feed of all the sheet material carried by the tapes. It is frequently desirable, however, to direct the direction of feed of adjacent rows of sheet material carried by the tapes separately and independently, and also individually to stack the different rows of sheets. Such operation has particular utility in connection with simultaneously feeding and stacking sheets of different dimensions at different locations.

An object of the present invention is to provide a new and improved method of and machine for simultaneously feeding groups of adjacent rows of sheet material along independent paths and separately stacking the same.

A further object is to provide a new and improved feeding-and-stacking machine adapted for the employment of a new and improved switching mechanism for switching rows of sheets separately and individually from one path of travel to other paths during the continuous operation of the machine.

Still a further object is to provide a feeding-and-stacking machine of this character that is highly flexible with regard to varying the dimensions of sheets, the number of rows of sheets that are to be fed and the direction of the paths of feed of the sheets.

Inasmuch as such a machine permits sheets of different sizes simultaneously to be fed and stacked, it is no longer necessary that the sheet material manufactured in the mill be first wound upon rolls prior to the feeding of the material from the rolls to the sheet feeding-and-stacking machine. Paper, for example, has previously been manufactured at mills, calendered and wound into rolls for later cutting and stacking in desired sizes and shapes. The rolls thus formed are transported to feeding-and-stacking machines and then cut into desired dimensions and stacked in layboys. In accordance with the present invention, on the other hand, the steps of rolling the paper into rolls as it is manufactured and then transporting the rolls to the feeding-and-stacking machine may be entirely eliminated.

A further object of the invention, therefore, is to provide a new and improved method of and machine for continuously manufacturing, feeding and stacking paper sheets and the like along a single production line.

Other and further objects will be explained hereinafter and will be more particularly pointed out in the appended claims.

In summary, the invention relates to a method of and a machine for feeding a plurality of adjacent rows of sheets to a predetermined region, feeding the plurality of rows of sheets thereafter beyond the predetermined region along any of a plurality of predetermined directions, stacking the sheets along the plurality of predetermined directions, and transferring the feed of one or more of the rows of sheets along different predetermined directions for further stacking or rejecting of the sheets. Preferred machine details and method steps will hereinafter be set forth.

The invention will now be more fully described in connection with the accompanying drawings, in which Figs. 1A and 1B together constitute a diagrammatic view, in side elevation, of a sheet feeding-and-stacking machine embodying the present invention in preferred form, the joining lines being indicated as B—B;

Fig. 2 is a view upon an enlarged scale of the sheet-cutting portion of the machine, including details not shown at the right-hand end of Fig. 1A;

Figs. 3 to 7 are similar views, upon a larger scale, of successive portions, from right-to-left of the remaining portions of the machine illustrated in Figs. 1A and 1B, illustrating, respectively, details of the switching, feeding, first layboy-stacking, second layboy-feeding and second layboy-stacking portions of the machine;

Figs. 8, 9 and 10 are fragmentary side elevations, partly broken away and with parts in section, upon still a larger scale, illustrating the respective positions I, II and III of the switching mechanism shown in Figs. 1A and 3;

Fig. 11 is a section, upon a larger scale, taken upon the line 11—11 of Fig. 3, looking in the direction of the arrows;

Fig. 12 is a top elevation upon still a larger scale of one of the switch fingers taken along the line 12—12 of Fig. 8, looking in the direction of the arrows;

Fig. 13 is a section taken upon the line 13—13 of Fig. 12, looking in the direction of the arrows;

Fig. 14 is a fragmentary perspective illustrating a few of the switch fingers and a partial schematic circuit diagram of the electric circuits for operating the same;

Figs. 15 and 16 are successive parts of a plan view of the portion of the machine shown to the left of the cutters in Fig. 1A and in Fig. 1B, illustrating the various tape conveyors and omitting other details in order not to confuse the drawing;

Figs. 17, 19, 20 and 21 are fragmentary plans, upon an enlarged scale, illustrating the successive parts of the conveyors shown in Figs. 15 and 16;

Fig. 18 is a similar view of a detail of Fig. 17;

Fig. 22 is a side elevation of the machine of Figs. 1A and 1B, utilizing a single cutter, connected to receive directly sheet material as it is manufactured; and Fig. 23 is a fragmentary perspective illustrating the multi-direction feed of the present invention.

The drawings illustrate a paper-sheet-cutting-and-feeding machine of well-known type, such as is commonly employed in paper mills to cut webs from a roll or rolls into sheets, and feeding the sheets by means of more or less horizontal conveyor tapes, into a lay-boy.

Referring first to Fig. 2, a web 1, as of paper or similar material, may be fed under and over idler rolls 313 and 315 and between a feed roll 5 and a cooperating drum 4, by which the paper is advanced past slitter blades 2, which sever the paper into longitudinal strips or rows of the desired width, over a guide board 11, to a stationary bed-knife cutter 10. While, in accordance with a feature of the present invention, the web 1 may be fed from unrolled stock, the web could, if desired be fed from a roll, not shown. The drum 4 may be driven from a variable-speed transmission unit, not shown, as described, for example, in the said U. S. Letters Patent 2,576,956. The term "web," "paper," "sheet" or its equivalent, will be employed herein to denote either a single layer or a plurality of superposed layers of the paper, board or other material. A rotary cutter 9, operated synchronously with the feeding of the web by the feed roll 5 and the drum 4, as, for example, by the said variable-speed transmission unit, not shown, cooperates with the bed cutter 10 to cut the traveling web 1 into sheets 80 of the desired length.

Owing to the feeding action of the roll 5 and the drum 4, aided by gravity, the sheets 80 travel, at a downward incline, over a guideboard 12, toward a series of cooperating high-speed conveyor tapes or belts 16 and 18.

Figure 23:
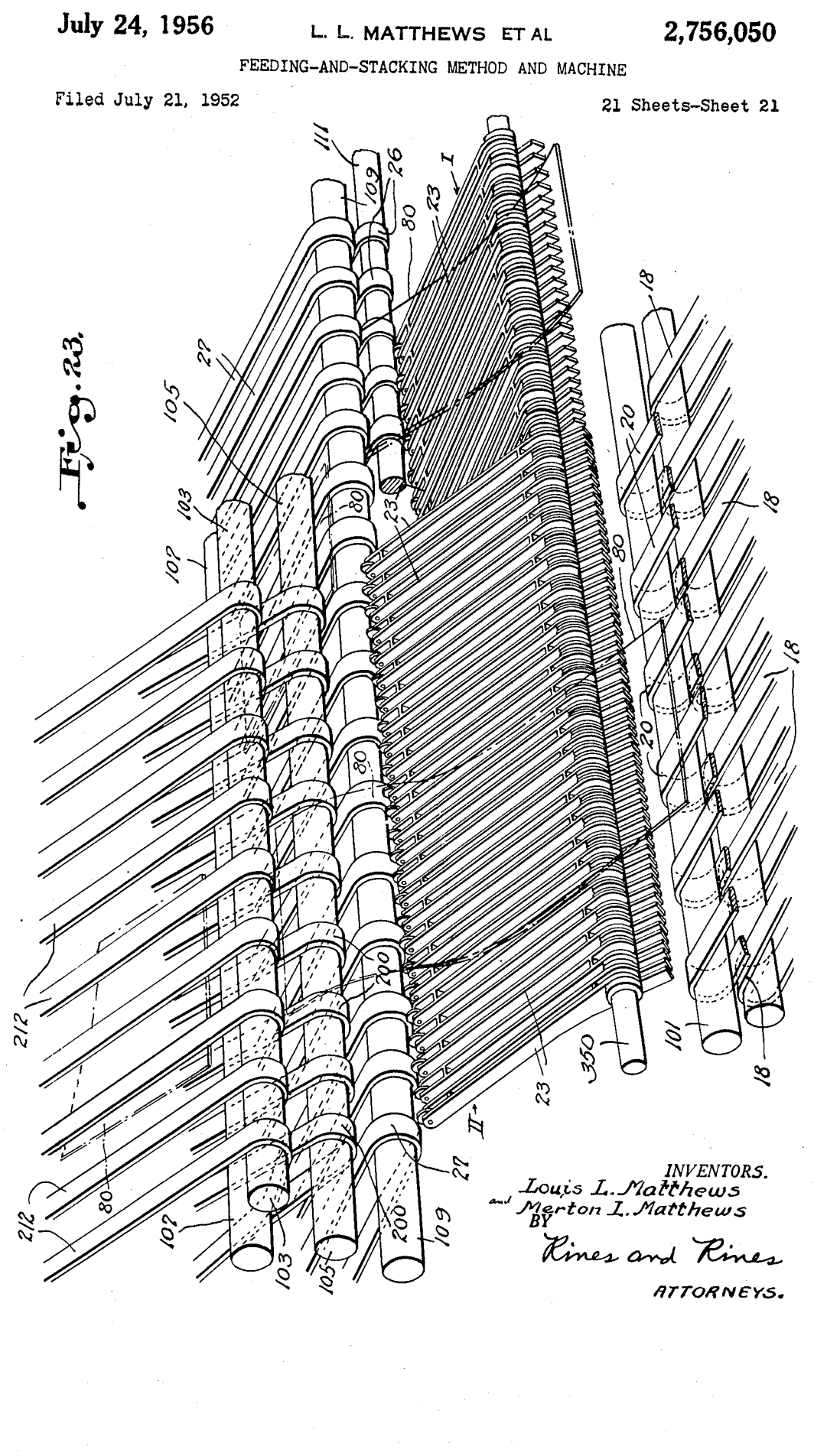

If a plurality of slitted streams of the sheet material are employed, some of the slitted streams may be divided at the feed roll 5 and drum 4 and fed, as at 1', to a further similar feed roll 5' and drum 4'. These streams may then be passed over a guide board 11' to a stationary bed-knife cutter 10' and may be cut into sheets 80 by a rotary cutter 9', the sheets 80 being passed over a guide board 12' toward further high-speed conveyor tapes or belts 20 also cooperating with the tapes or belts 18. The cutter 9' may cut sheets of different length than the length of sheets cut by the cutter 9. A second set of cutters 2' may be employed for the purpose of setting up the apparatus, while in operation, for the subsequent slitting of sheets of different size. The position of the slitters 2, 2' may, if desired, be laterally staggered across the machine so that adjacent rows of differently dimensioned sheets are produced, as shown in Fig. 23, and fed in adjacent rows by the tapes 18, 20.

The tapes or belts 16, 18 and 20 are mounted over rolls driven from a chain 15. A chain 13 drives an intermediate shaft 14 from a driven shaft 7 that is the main drive shaft of the cutter and also drives the drum 4; and the shaft 14, in turn, drives the chain 15 to operate the tapes or belts 16 and 18. The forward end roll of the tapes 20 is shown at 101, Figs. 1A and 2.

From the forward end roll 101, the sheets 80 cut by the rotary cutters 9 and 9', are fed to a predetermined switching region generally indicated at 22, Fig. 1A, and they are received on a plurality of parallel switch fingers 23, spaced transversely of the machine and of the direction of travel of the sheets 80. The switch fingers 23 are adapted to occupy selectively any of a plurality of different angular positions. Three such positions are illustrated, respectively designated at I, II and III. Since any one switch finger 23 can not occupy more than one of these three positions at a time, two of these three positions, in any particular figure, are illustrated by dashed lines.

In accordance with the present invention, however, one or more sections or groups of the switch fingers may be oriented in one of the said three positions, I, II and III, while other groups are oriented in others of the said three positions. In Fig. 23, for example, some sections of switch fingers are in position I, and others in position II. If desired, all of the switch fingers may, on the other hand, be oriented at the same position.

When the switch fingers 23 or any section or group thereof, are oriented in position I, Figs. 1A, 3 and 8, the sheets are directed by the switch fingers, or the said group thereof, in a first direction nearly horizontally between cooperating conveyor tapes or belts 26 and 27, and then, substantially horizontally between the tapes or belts 27 and further tapes or belts 28 and 146, for conveyance to a first layboy marked "A." The tapes 27 revolve between rolls 109 and 128; the tapes 26, between rolls 111 and 124, Figs. 3–4, 15 and 18; the tapes 146, between rolls 129 and 147; and the tapes 28, between the roll 126, Fig. 4, and the forward roll 145, adjacent the layboy "A." In this first layboy "A," the sheets 80 become stacked or piled upon a skid support or platform 88. The customary front stop 7, Fig. 1B, side jogger blades 29 and rear jogger fingers 30 are provided for assuring even stacking or piling on the support or platform. The jogger blades 29 may compartmentalize the layboys for sheets of different width that, as later explained, may be fed to the layboys. The jogger blades 29 may be oscillated upon rods 33 laterally reciprocated as shafts 34 are rotated by a motor 35, and the rear jogger blades may be oscillated all as described, for example, in U. S. Letters Patent 2,261,972 and 2,367,416, issued respectively on November 11, 1941, and January 16, 1945, to the said Louis L. Matthews. As the sheets continue to be fed into the layboy "A," and become stacked or piled on the skid support or platform 88, the skid support or platform 88 becomes automatically lowered by degrees, in order to maintain the level of the stack or pile of sheets 80 approximately uniform. This may be effected in any desired manner, as by the chains 31 operated from the motor 32, Fig. 4, and as described, for example, in U. S. Letters Patent 1,545,912, issued July 14, 1925, to Charles B. Maxson.

When the switch fingers 23, or any section or group thereof, are oriented in position III, Figs. 1A, 3 and 10, the sheets are fed from the switch fingers 23 to a downwardly inclined chute 44 which may, for example, serve as a reject chute.

When the switch fingers assume position II, Figs. 1A and 9, however, the sheets are fed along a third direction, up a rather steep incline between tapes 200 and 212, Figs. 1A and 3, and thence substantially horizontally between tapes 201 and a horizontal portion of the tapes 200 along a level above the level of the tapes 26—27—28. The sheets are continuously fed substantially horizontally over a laterally extending support 127 between further sets of cooperating tapes 214—201, Fig. 4; thence over a further support 133 by tapes 216—214—218, Fig. 5; and finally over still another support 138 by tapes 220—218—222—224, Figs. 1B, 6 and 7 into the layboy "B." The tapes 200 revolve about the rolls 105, 119, 123 and 121, Figs. 1A, 3, 4 and 17; the tapes 212, between rolls 103, 107 and 117, Figs. 1A and 3; the tapes 201, between rolls 115 and 131, Fig. 15; the tapes 214 between rolls 125 and 132, Figs. 1A, 4 and 5; the tapes 216, between rolls 130 and 135, Figs. 1B, 15–16 and 19–20; the tapes 218, between rolls 134 and 137, Figs. 1B, 5–6; the tapes 220, between rolls 136 and 140, Figs. 1B, 16, 20–21; the tapes 222, between rolls 139 and 150, Figs. 1B, 6 and 7; and the tapes 224, between the roll 141 and drop wheels 151. In this second layboy "B," the sheets 80 become stacked or piled similarly to their stacking or piling in the first layboy "A," but upon a skid support or platform 88 that may be previously adjusted so as to occupy a higher level just below that of the delivery of the sheets into the layboy "B," as illustrated in Figs. 1B and 7. The automatic jogging systems, employed in connection with the layboy "A" may be employed also in connection with the layboy "B" and the corresponding parts are therefore given the same reference numerals as those at the layboy "A."

The roll 111 of the tapes 26 and the roll 109 of the tapes 27 may be driven by a chain 37 from an air-clutch member 38. The drive for this clutch is brought forward from shaft 14, Fig. 1A, by chain 500. The roll 103 of the tapes 212 may in like fashion be driven by a chain 39 from a similar member 40 synchronously operated with the member 38 and the beforementioned shaft 14. The chain 39 also drives the rear roll 115 of the tapes 201, the forward roll 123 of the tapes 200, Fig. 4, and the rear roll 125 of the tapes 214. The rear roll 130 of the tapes 216 is driven from the forward roll 131 of the tapes 201 by a chain 41. The rear roll 134 of the tapes 218 is driven from the forward roll 132 of the tapes 214 by a chain 42, Fig. 5. The rear roll 136 of the tapes 220 is similarly driven by a chain 43 from the forward roll 135 of the tapes 216. The forward roll 137 of the tapes 218, Fig. 6, and the rear roll 139 of the tapes 222, and the forward roll 140 of the tapes 220 and the rear roll 141 of the tapes 224 are similarly chain-linked.

Each switch finger 23 is preferably formed of two parallel arms, Figs. 12 and 13, intermediately joined by struts 260. The switch fingers terminate at their free ends in rolls 261, Figs. 8, 9 and 10, mounted within bearings 262 in the arms. At the other end, the switch finger arms are provided with an enlarged bearing 263 for receiving a shaft 350, Fig. 11, about which the switch fingers 23 may pivot. The pivoting is effected, as hereinafter explained, under the control of a pair of solenoids 25 and 27 for each switch finger. The array of solenoids 27 are mounted upon L-brackets carried by an inclined I-beam 264 running transversely of the machine. A similar substantially vertical I-beam 265 supports a similar L-bracket for mounting the solenoids 25. Each armature 225 of the solenoids 25 is secured, as by a threaded screw 266, Figs. 8 to 10, to a link arm 325 pivoted to the screw at 267. At the other end, the link arm 325 is pivoted by a cross bar 268, Fig. 11, within bearings 269 in a downwardly inclining projection 270 of the switch finger arms 23, the axis of the bearings 269 being slightly displaced, shown to the right in Fig. 13, from the axis of the bearing 263. Each armature 227 of the solenoids 27 is similarly secured to a link arm 327 pivoted at 271 to the securing screw 272, Figs. 8 to 10, and pivoted about the cross bar 268 within the switch-finger bearings 269 by a yoke 273.

With neither solenoid 25 or 27 energized, the switch fingers 23 may drop under the influence of gravity to a limited reject position III, more clearly shown in Fig. 10. When the solenoid 25 is energized, as later discussed, the armature 225 becomes drawn into the winding, pulling almost vertically downward on the link arm 325 and holding the switch finger 23 in a substantially horizontal position I, Fig. 8, for directing sheets ultimately to layboy "A." When, on the other hand, the solenoid 27 is energized, as hereinafter explained, its armature 227 is drawn into the winding inclinedly pulling the link arm 327 downward and pivoting the switch finger 23 about its shaft pivot 350 to position II, Fig. 9, for directing sheets to the layboy "B."

The machine of the present invention may be operated in a number of different ways, depending upon the desired end. All of the sheets, for example, may be fed to layboy "A" or layboy "B," and, when the layboy is filled, the direction of feed of the sheets may be changed by the switch fingers 23 to cause the sheets to be fed to the other layboy. As another example, adjacent rows of sheets may be simultaneously fed to layboys "A" and "B" by groups of switch fingers oriented in positions I and II, respectively. When either layboy is filled, a plurality of longitudinally-extending fingers 90, Figs. 1A, 1B, 4 and 7, normally withdrawn within the frame of the machine, as shown, may be extended, into the layboy, to serve temporarily as an auxiliary support for receiving and stacking the sheets while the loaded main skid support or platform 88 is being removed, either by side or front unloading. An empty main support or platform is then substituted and the fingers 90 are again withdrawn, the sheets temporarily stacked thereupon being thus transferred to the substituted main skid support. The fingers 90 forming the auxiliary support, are secured at their rear ends to a carriage 290 movable along a track 291 by a sprocket chain 292, driven, in turn, by a reversible motor 293, the operation of which in opposite directions will effect the extension of the fingers 90 into the layboy and their retraction within the frame of the machine in back of the rear joggers 30, as shown in Figs. 1A, 3 and 4, and as more fully described in the said Letters Patent 2,521,075.

As an illustration, let it be assumed that there are thirty-six switch fingers 23, Fig. 11, and that a section or group of twenty-five of these, say the first twenty-five from the left as viewed in Fig. 11, are to operate synchronously in unison; and the remaining section or group of eleven fingers, numbered twenty-six to thirty-six, are also to operate in unison, but independently of the first section or group of twenty-five switch fingers. Corresponding to each solenoid 25, associated with each switch finger 23 is a tap switch having a plurality of positions, Fig. 14, labelled 1 through 4 and "off." These tap switches are themselves labelled "SA" with a subscript indicating the particular corresponding switch finger 23. Thus the first switch finger #1, is shown provided with a tap switch $SA_1$, and the last switch finger #36, with a tap switch $SA_{36}$.

Corresponding to each solenoid 27 associated with each switch finger 23 is a similar tap switch, labelled "SB." The first switch finger #1 is provided with a tap switch $SB_1$, and the last switch finger #36, with a tap switch $SB_{36}$.

The lower terminal of the lowermost solenoid winding 27 shown in Fig. 14, associated with switch finger #1, is connected by an electric circuit conductor 91 to the switch 92 of the tap switch $SB_1$. The upper terminal of this solenoid is connected by conductor 93 to the negative terminal "−" of a source of direct-current voltage, labelled "Rectifier," since it may produce such direct-current voltage by rectification from the alternating-current mains, not shown. The uppermost solenoid 27 shown in Fig. 14, associated with switch finger #36, is connected by an electric circuit conductor 94 and part of the conductor 93 to the same negative terminal of the rectifier, and by a further conductor 95 to the switch 96 of the tap switch $SB_{36}$.

In like fashion, the solenoid 25 associated with the switch finger #1 is connected by an electric circuit conductor 97 to the conductor 93 and the negative rectifier terminal, and by a conductor 98 to the switch 99 of the tap switch $SA_1$. Similarly, conductor 190 connects the solenoid winding 25 associated with the switch finger #36 to conductor 93 and the rectifier negative terminal, and conductor 191 connects the said winding, also, to the switch 192 of the tap switch $SA_{36}$. The tap switches and other associated circuits heretofore and hereinafter described of the fingers intermediate fingers #1 and #36 are not shown in order not to complicate the drawing, but it is to be understood that similar tap switches and circuits are provided for each switch finger. Thus the switch fingers #1 and #36 are representative of the first group of switch fingers in the above illustration (#1—#25), and of the second group (#26—#36), respectively. The dashed line between the switch fingers indicates that the intermediate switch fingers are intended to be there positioned, but are not actually shown in order not to confuse the disclosure.

With the first twenty-five switch fingers, represented in Fig. 14 by the first switch finger #1, and the last eleven switch fingers, represented by the last switch finger #36, to operate as two independent groups, the switch 99 of the tap switch $SA_1$ (actually the switches of all the tap switches $SA_1$ through $SA_{25}$) is set to position 2 thereon, and the switch 192 of the tap switch $SA_{36}$ (actually the switches of all the tap switches $SA_{26}$ through $SA_{36}$) is set to position 1 thereon. The before-mentioned tap switches $SB_1$ and $SB_{36}$ are, in actual practice, preferably ganged to the respective tap switches $SA_1$ and $SA_{36}$, as illustrated by dotted lines, so that the switches 92 and 96 of the tap switch $SB_1$ and $SB_{36}$ are set at their respective positions 2 and 1.

The positive terminal "+" of the rectifier is connected through a master switch MS and two further master switches $MS_1$ and $MS_2$ to two banks of switches 195, 197, etc. and 196, 198, etc. The switches of the first bank are ganged to the corresponding switches of the second bank so that when a switch of the first bank is closed, the corresponding switch of the second bank is opened. This is schematically represented by the dotted ganging lines. Ganged push-button reject controls associated with each such switch are also shown at $R_1$, $R_2$, $R_3$ and $R_4$. Thus when switch 195 of the left-hand bank is closed, corresponding switch 196 of the right-hand bank is opened; and when switch 197 of the left-hand bank is opened, switch 198 of the right-hand bank is closed; and so on for the remaining switches.

If it is desired that the rows of sheets fed over the switch fingers #1 to #25 be directed thereby to the tapes 200—212 in order to become stacked in layboy "B," switch 198 will be closed, as indicated in Fig. 14. The positive terminal of the rectifier is thus connected through master switches MS and $MS_2$, through the closed switch 198 and by conductors 394 and 494 to terminal 2 of tap switch $SB_1$. The connection continues through the switch 92 of the tap switch $SB_1$ and conductor 91 through the solenoid winding 27 associated with switch finger #1, and back to the negative terminal of the rectifier by conductor 93. The said solenoid winding 27 thus becomes energized, drawing in the armature 227, thereby pulling inclinedly downward upon the link arm 327 and pivoting the switch finger #1 upward about its pivot shaft 350 to position II, more clearly shown in Fig. 9. Since switch finger #1 is illustrative of all of the switch fingers of the before-mentioned group #1 to #25, all of the sheets fed along switch fingers #1 to #25, therefore, will be directed to layboy "B," Fig. 23.

With switch 195 closed, Fig. 14, the positive rectifier terminal is connected through $MS_1$, the switch 195, conductor 193, switch position contact 1 of tap switch $SA_{36}$, switch 192, conductor 191 to the winding 25 of the solenoid associated with switch finger #36. The connection continues through the said winding 25, by conductors 190 and 193 to the negative rectifier terminal, thus energizing the solenoid 25, drawing in its armature 225, pulling straight down upon the link arm 325 and therefore maintaining the switch finger 36 in the substantially horizontal position I, Fig. 8. Since the switch finger #36 is representative of the second group of switch fingers #26 to #36, all of the rows of sheets fed along these switch fingers will thus be directed between the tapes 26 and 27 for feeding to layboy "A," Fig. 23, simultaneously with the feeding of the other rows of sheets to layboy "B," as before described.

If it should be desired to move switch fingers #1 to #25 into the same position I of switch fingers #26 to #36, as for the purposes of delivering all the rows of sheets fed along the machine to layboy "A," it is merely necessary to open switch 198, simultaneously closing switch 197. The winding 25 of the solenoid associated with switch finger #1 (and also the solenoid windings associated with switch fingers #2 to #25) will then be energized through the connection of the positive rectifier terminal to the winding through $MS_1$, closed switch 197, conductor 294, contact terminal 2 and switch 99 of tap switch $SA_1$ and conductor 98. Since the solenoid 27 of switch finger #1 (and the solenoids of switch fingers #2 to #25, also) has been de-energized by the opening of the switch 198, the energized solenoid 25 will cause the pivoting of switch finger #1 (and switch fingers #2 to #25, also) to position I.

Were it desirable, on the other hand, to move switch fingers #26 to #36 to position II, in order to feed layboy "B," switch 196 would be closed, simultaneously opening switch 195 and de-energizing the solenoid winding 25 associated with switch #36 (and de-energizing the windings associated with switches #26—#35, also). With switch 196 closed, the positive rectifier terminal connects to the corresponding solenoid winding 27 through $MS_2$, the switch 196, conductor 393, contact terminal 1 and switch 96 of tap switch $SB_{36}$ and conductor 95, thus causing the energization of the same and the elevating of switch finger #36 to position II. In a similar manner switch fingers #26 to #35 will be elevated to position II, so that the sheets fed to switch fingers #26 to #36 will be directed to layboy "B."

Assuming switch fingers #1 to #25 are in position II, and switch fingers #26 to #36 are in position I, it may be desired to reject the sheets fed along switch fingers #26 to #36, as when, for example, imperfections are suddenly spotted in such sheets. It is merely necessary to open the master switch $MS_2$, de-energizing the windings 25 associated with switch fingers #26 to #36, and thus permitting the said switch fingers to drop to the downwardly inclining position III, Fig. 10. This could also be accomplished by opening reject button $R_1$. The sheets are then directed to the reject or other chute 44. Clearly, instead of the reject chute, a further tape feed or other conveying path could be utilized.

Opening the master switch MS, on the other hand, will effect de-energization of all of the solenoid windings associated with all of the switch fingers 23, causing them all to direct the sheets to the reject or other chute 44.

While in Fig. 14 four positions are provided in each tap switch SA and SB, and while four switches in the left- and right-hand banks 195, 197, etc. and 196, 198, etc. are shown, the invention is clearly useful with more or less switch positions and switches, depending upon the number of paths of separate feed for adjacent rows of sheets that may be desired. The four positions, of course, will permit dividing up the adjacent rows of sheets fed along the machine into four independent paths, with any one path having any of three directions of feed—i. e. along the directions I, II or III.

As a further illustration, it might be desired to feed the sheets passing over switch fingers #1 to #10 along the direction I of Fig. 8; the sheets passing over switch fingers #11 to #20, along direction II, Fig. 9; the sheets passing over switch fingers #21 to #26, along direction I; and the sheets passing over switch fingers #27 to #36, along direction II. Tap switches $SA_1$ to $SA_{10}$ would then be set to position 1; tap switches $SA_{11}$ to $SA_{20}$, to position 2; tap switches $SA_{21}$ to $SA_{26}$, to position 3; tap switches $SA_{27}$ to $SA_{36}$, to position 4. Upon closing switch 195, the switch finger #1 (to #10) will be oriented in position I. With switch 198 closed, the switch finger #11 (to #20) will assume position II. If switch 295 is closed, switch finger #21 (to #26) will become oriented along position I. With the closing of switch 298, switch finger #27 (to #36) will assume position II.

To continue with still a further example, assume it is desired suddenly to reject the sheets fed along switch fingers #27 to #36. By opening reject button R₄, this is rapidly accomplished.

The above illustrations are only a few of the many combinations that may be effected in accordance with the highly flexible system of the present invention. These combinations are rapidly effected at the will of the operator by mounting the panel board 351 containing the controls at the side of the machine in the vicinity of the switching section 22, for rendering the above-described electric circuits that energize and de-energize the solenoids effective or ineffective, thereby, at will, adding or subtracting any number of the incremental switching fingers to or from the groups of switching fingers oriented along any particular directions. The controls of Fig. 14 may appear on the panel board 351 in the manner illustrated in Fig. 3, providing four possible sheet paths orientable along any of three directions.

In view of the great flexibility afforded by the present invention in permitting the simultaneous cutting of sheet material into different sizes, the simultaneous feeding of sheets of the same or different sizes along a plurality of independent paths that may be directed along a plurality of different directions, the simultaneous stacking of sheets at different locations and the continuous operation without shut-down even after full stacks of sheets have been obtained, it is now possible, as before mentioned, to eliminate the step of rolling paper manufactured in the paper mills into rolls preliminary to attaching such rolls to feeding-and-stacking machines. The present invention, on the contrary, permits a continuous uninterrupted production line from the preparation of the pulp in the mill, through the steps leading to the production of sheet material to the feeding-and-stacking machine.

In Fig. 22, such a continuous production line is illustrated. The pulp is fed from the pulp preparation plant 300 at the mill to a Fourdrinier machine 301. The pressed sheet material thus produced is fed along drying rolls 305 in a dryer 303 and thence to calenders 307. The sheet material 1 then passes under and over rolls 309 and 311, respectively, to the rolls 313, 315 of the machine of the present invention shown in Fig. 2. Instead of using two sets of slitters and cutters, however, a single slitter 2 and rotary cutter 9 may be employed to operate directly upon the web 1 as it is being produced in the mill. The costly step of pre-rolling the manufactured web and then mounting the roll for cutting, feeding and stacking has thus become obviated. The machine of the present invention shown in Figs. 1A and B is reproduced schematically in Fig. 22 to illustrate that the manufactured paper is available at the layboys "A" and "B," cut and stacked in any desired sizes, and that rejecting, stacking and other desired operations are continuously effected as the sheet material itself is being manufactured.

A description of many portions of the machine, an understanding of which is not essential to an understanding of the present invention, has purposely been omitted and many parts of the machine have purposely not been illustrated in order not to detract attention from the features of essential novelty. Fuller explanations of such portions of the machine will be found in the Letters Patent above referred to. It will be understood that the features of novelty may be embodied in other machines and in machines of other types and that modifications may be made by persons skilled in the art without departing from the spirit and scope of the invention as defined in the appended claims.

What is claimed is:

1. A sheet-feeding machine having, in combination, a switch comprising a plurality of adjacent switching sections, means for feeding a plurality of adjacent rows of sheets to and upon the adjacent switching sections, a plurality of means for respectively feeding the rows of sheets beyond the switch along any of a plurality of directions, and means operable during the feeding for independently actuating the switching sections to direct the row or rows of sheets thereupon toward any of the plurality of feeding means.

2. A sheet-feeding machine having, in combination, a switch comprising a plurality of adjacent switching sections, means for feeding a plurality of adjacent rows of sheets to and upon the adjacent switching sections, a plurality of means for respectively feeding the rows of sheets beyond the switch along any of a plurality of directions, a plurality of solenoid-controlled links connected to the switching sections for actuating the same, normally ineffective electric circuits which, when effective, energize the respective solenoids of the plurality of solenoid-controlled links, thereby to control the actuation of the switching sections, and control means associated with the electric circuits for rendering the same effective, thereby to effect the independent energizing of the solenoids by the electric circuits in order to actuate the switching sections to direct the row or rows of sheets thereupon toward any of the plurality of feeding means.

3. A sheet-feeding machine having, in combination, a switch comprising a plurality of adjacent switching sections, a first conveyor, means for driving the first conveyor to feed a plurality of adjacent rows of sheets to and upon the adjacent switching sections, second and third conveyors, means for driving the second and third conveyors for respectively feeding the rows of sheets beyond the switch along either of two directions, pairs of solenoid-controlled links connected to the switching sections for actuating the same, normally ineffective electric circuits which, when effective, selectively energize each solenoid of the pairs of solenoid-controlled links thereby to control the actuation of the switching sections along either of the said two directions, electric switch-control means associated with the electric circuits for rendering the same effective, thereby to effect the independent energizing of the solenoids by the electric circuits in order to actuate the switching sections to direct the row or rows of sheets thereupon toward either the second or third conveyors, and stacking means for respectively receiving and stacking the sheets fed along the second and third conveyors.

4. A sheet-feeding machine having, in combination, a switch comprising a plurality of adjacent switching sections, a first conveyor, means for driving the first conveyor to feed a plurality of adjacent rows of sheets to and upon the adjacent switching sections, second and third conveyors, means for driving the second and third conveyors for respectively feeding the rows of sheets beyond the switch along either of two directions, a reject chute disposed along a third direction, pairs of solenoid-controlled links connected to the switching sections for actuating the same, normally ineffective electric circuits which, when effective, selectively energize each solenoid of the pairs of solenoid-controlled links thereby to control the actuation of the switching sections along any of the said three directions, and electric switch-control means associated with the electric circuits for rendering the same effective, thereby to effect the independent energizing of the solenoids by the electric circuits in order to actuate the switching sections to direct the row or rows of sheets thereupon along any of the said three directions.

5. A sheet-feeding machine having, in combination, a plurality of adjacent switch fingers, means for feeding a plurality of adjacent rows of sheets to and upon the switch fingers, a plurality of means for respectively feeding the rows of sheets beyond the switch fingers along any of a plurality of directions, a pair of solenoid-controlled links connected to each switch finger for actuating the same, a normally ineffective electric circuit which, when effective, energizes either solenoid of each pair of solenoids to control the actuation of each switch finger, and electric switch-control means associated with each electric circuit for rendering the same effective, thereby to effect the independent energizing of each solenoid of the pair of solenoids by the respective electric circuit in order to actuate the respective switch finger toward any of the plurality of feeding means.

6. Apparatus of the character described having, in combination, means for feeding sheet material as it is produced along a predetermined path, means disposed in the path for cutting the sheet material to produce a plurality of adjacent rows of sheets, means for simultaneously feeding the plurality of cut adjacent rows of sheets to a predetermined region, means for feeding the rows of sheets beyond the predetermined region along a first predetermined direction, and means for transferring the feed of one or more of the rows of sheets from the predetermined region along each of a plurality of different predetermined directions while maintaining the feeding of one or more of the rows of sheets along the first predetermined direction.

7. A method of feeding sheets that comprises feeding sheets to and upon a predetermined region, selecting a portion of the region of any desired variable width less than the width of the predetermined region, and orienting such portion along any of a plurality of different predetermined directions in order correspondingly to direct those sheets upon such portion along such different predetermined directions.

8. A method of feeding sheets that comprises feeding sheets to and upon a predetermined region, selecting a plurality of portions of the region each of any desired variable width less than the width of the predetermined region, and orienting one or more of such portions along any of a plurality of different predetermined directions in order correspondingly to direct only those sheets upon the said one or more portions along such different predetermined directions.

9. A method of feeding sheets that comprises feeding a plurality of adjacent rows of sheets to and upon a predetermined region, orienting one or more portions of the region corresponding to one or more of the rows of sheets along a different predetermined direction than other portions of the region to feed one or more of the rows of sheets over and beyond the predetermined region simultaneously along each of a plurality of different predetermined directions, and varying in increments the width of the said one or more portions of the region during the feeding of the sheets.

10. A sheet-feeding machine having, in combination, means for feeding a plurality of adjacent rows of sheets to and upon corresponding portions of a predetermined region, means for feeding one or more of the rows of sheets thereafter over and beyond the corresponding portion or portions of the predetermined region along a first predetermined direction, means for simultaneously feeding a different one or more of the rows of sheets over and beyond the corresponding portion or portions of the predetermined region along a second predetermined direction, and means operable during the feeding of the sheets for varying in increments the width of any of the said corresponding portion or portions of the predetermined region.

11. A sheet-feeding machine having, in combination, means for feeding sheets to and upon a predetermined region, means for orienting any desired portion of the region of width less than the width of the predetermined region along any of a plurality of different predetermined directions in order correspondingly to direct those sheets upon such portion along such predetermined directions, and means operable during the feeding of the sheets for varying in increments the width of the said desired portion.

12. A sheet-feeding machine having, in combination, a switch comprising a plurality of adjacent switching sections, means for feeding a plurality of adjacent rows of sheets to and upon the adjacent switching sections, a plurality of means for respectively feeding the rows of sheets beyond the switch along any of a plurality of directions, means for independently actuating the switching sections to direct the row or rows of sheets thereupon toward any of the plurality of feeding means, and means operable during the feeding of the sheets for varying in increments the width of one or more of the switching sections.

13. A sheet-feeding machine having, in combination, a switch comprising a plurality of substantially parallel switching fingers pivoted along a common axis, means for feeding sheets over the said axis to and upon the switching fingers, means for independently pivoting each of the switching fingers about the said axis along any of a plurality of directions, and means cooperative with the pivoting means and operable during the feeding of the sheets for substantially simultaneously pivoting any desired number of the plurality of switching fingers along any of the plurality of directions.

14. A sheet-feeding machine having, in combination, a switch comprising a plurality of substantially parallel switching fingers pivoted along a common axis, means for feeding sheets over the said axis to and upon the switching fingers, means for independently pivoting each of the switching fingers about the said axis along any of a plurality of directions, a plurality of means, one corresponding to each of the plurality of directions, for feeding the sheets beyond the switch, and means cooperative with the pivoting means and operable during the feeding of the sheets for substantially simultaneously pivoting any desired number of the plurality of switching fingers along any of the plurality of directions.

15. A sheet-feeding machine having, in combination, a sheet-feeding switch comprising a plurality of substantially parallel switching fingers pivoted along a common axis, means for independently pivoting each of the switching fingers about the said axis along any of a plurality of directions, and means cooperative with the pivoting means and operable during the feeding of the sheets for substantially simultaneously pivoting any desired number of the plurality of switching fingers along any of the plurality of directions.

16. A sheet-feeding machine having, in combination, a switch comprising a plurality of substantially parallel switching fingers pivoted along a common axis, means for feeding sheets over the said axis to and upon the switching fingers, a plurality of solenoid-controlled links corresponding to the plurality of switching fingers and adapted, when energized, to pivot the same about the said axis along any of a plurality of directions, a plurality of normally ineffective electric-circuit means corresponding to the plurality of solenoid-controlled links and which, when effective, energize the corresponding solenoid-controlled links to pivot the corresponding switching fingers, and control means associated with the electric circuits for selectively rendering the same effective in order, during the feeding of the sheets, substantially simultaneously to pivot any desired number of the plurality of switching fingers along any of the plurality of directions.

17. A sheet-feeding machine having, in combination, a sheet-feeding switch comprising a plurality of substantially parallel switching fingers pivoted along a common axis, a plurality of solenoid-controlled links corresponding to the plurality of switching fingers and adapted, when energized, to pivot the same about the said axis along any of a plurality of directions, a plurality of normally ineffective electric-circuit means corresponding to the plurality of solenoid-controlled links and which, when effective, energize the corresponding solenoid-controlled links to pivot the corresponding switching fingers, and control means associated with the electric circuits for selectively rendering the same effective in order, during the feeding of the sheets, substantially simultaneously to pivot any desired number of the plurality of switching fingers along any of the plurality of directions.

18. A sheet-feeding machine having, in combination, a switch comprising a plurality of substantially parallel switching fingers pivoted along a common axis, means for feeding sheets over the said axis to and upon the switching fingers, a plurality of solenoid-controlled links corresponding to the plurality of switching fingers and adapted, when energized, to pivot the same about the said axis along any of a plurality of directions, a plurality of means, one corresponding to each of the plurality of directions, for feeding the sheets beyond the switch, a plurality of normally ineffective electric-circuit means corresponding to the plurality of solenoid-controlled links and which, when effective, energize the corresponding solenoid-controlled links to pivot the corresponding switching fingers, and control means associated with the electric circuits for selectively rendering the same effective in order, during the feeding of the sheets, substantially simultaneously to pivot any desired number of the plurality of switching fingers along any of the plurality of directions.

19. A sheet-feeding machine having, in combination, a switch comprising a plurality of substantially parallel switching fingers pivoted along a common axis, means for feeding sheets over the said axis to and upon the switching fingers, a plurality of pairs of solenoid-controlled links corresponding to the plurality of switching fingers and adapted, when energized, to pivot the same about the said axis along any of a plurality of directions, a plurality of normally ineffective electric-circuit means corresponding to the plurality of pairs of solenoid-controlled links and which, when effective, energize the corresponding solenoid-controlled links of the pairs of solenoid-controlled links to pivot the corresponding switching fingers, and control means associated with the electric circuits for selectively rendering the same effective in order, during the feeding of the sheets, substantially simultaneously to pivot any desired number of the plurality of switching fingers along any of the plurality of directions.

20. A sheet-feeding machine having, in combination, a switch comprising a plurality of substantially parallel switching fingers pivoted along a common axis and each provided with a projection having an axis displaced from the said common axis, means for feeding sheets over the said common axis to and upon the switching fingers, a plurality of solenoid-controlled links, one corresponding to each of the plurality of switching fingers and connected to the corresponding switching-finger projection axis to pivot the same about the said common axis along any of a plurality of directions upon energization of the corresponding solenoid-controlled links, a plurality of normally ineffective electric-circuit means corresponding to the plurality of solenoid-controlled links and which, when effective, energize the corresponding solenoid-controlled links to pivot the corresponding switching fingers, and control means associated with the electric circuits for selectively rendering the same effective in order, during the feeding of the sheets, substantially simultaneously to pivot any desired number of the plurality of switching fingers along any of the plurality of directions.

21. A sheet-feeding machine having, in combination, a switch comprising a plurality of substantially parallel switching fingers pivoted along a common axis and each provided with a projection having an axis displaced from the said common axis, means for feeding sheets over the said common axis to and upon the switching fingers, a plurality of pairs of solenoid-controlled links, one pair corresponding to each of the plurality of switching fingers and with the links of the pair connected at different angles to the corresponding switching-finger projection axis to pivot the same about the said common axis along any of a plurality of directions upon energization of the corresponding solenoid-controlled link, a plurality of normally ineffective electric-circuit means corresponding to the plurality of solenoid-controlled links, and which, when effective, energize the corresponding solenoid-controlled links to pivot the corresponding switching fingers, and control means associated with the electric circuits for selectively rendering the same effective in order, during the feeding of the sheets, substantially simultaneously to pivot any desired number of the plurality of switching fingers along any of the plurality of directions.

22. A sheet-feeding machine having, in combination, a switch comprising a plurality of substantially parallel switching fingers pivoted along a common axis and each comprising a pair of arms provided with a lower projection having an axis displaced from the said common axis, means for feeding sheets over the said common axis to and upon the arms of the switching fingers, a plurality of pairs of solenoid windings, armatures and links, one pair corresponding to each of the plurality of switching fingers and with the links of the pair connected at different angles to the corresponding switching-finger projection axis to pivot the same about the said common axis along any of a plurality of directions upon energization of the corresponding solenoid winding, a plurality of normally ineffective electric-circuit means corresponding to the plurality of solenoid-controlled links and which, when effective, energize the corresponding solenoid-controlled links to pivot the corresponding switching fingers, and control means associated with the electric circuits for selectively rendering the same effective in order, during the feeding of the sheets, substantially simultaneously to pivot any desired number of the plurality of switching fingers along any of the plurality of directions.

23. A sheet-feeding machine having, in combination, a switch comprising a plurality of substantially parallel switching fingers pivoted along a common axis and each comprising a pair of arms terminated in a roll and provided with a lower projection having an axis displaced from the said common axis, means for feeding sheets over the said common axis to and upon the arms of the switching fingers, a plurality of pairs of solenoid windings corresponding to the plurality of switching fingers, means for mounting one of the windings of each of the pairs of the windings substantially below the switching fingers and along a line substantially parallel to the said common axis, means for mounting the other of the windings of each of the pairs of the windings to one side of the said line substantially parallel thereto, a plurality of solenoid-armature-connected links corresponding to the plurality of windings of the pairs of solenoid windings and connected to the switching-finger projection axis of the plurality of switching fingers in order to pivot the same about the said common axis along any of a plurality of directions upon energization of the corresponding solenoid windings, a plurality of normally ineffective electric-circuit means corresponding to the plurality of solenoid-controlled links and which, when effective, energize the corresponding solenoid-controlled links to pivot the corresponding switching fingers, and control means associated with the electric circuits for selectively rendering the same effective in order, during the feeding of the sheets, substantially simultaneously to pivot any desired number of the plurality of switching fingers along any of the plurality of directions.

References Cited in the file of this patent

UNITED STATES PATENTS

| Number | Name | Date |
|---|---|---|
| 2,184,522 | Greenwood | Dec. 26, 1939 |
| 2,427,223 | Moore | Sept. 9, 1947 |
| 2,436,179 | Rayburn | Sept. 17, 1948 |
| 2,476,371 | Haumann | July 19, 1949 |
| 2,478,610 | Uschmann | Aug. 9, 1949 |
| 2,521,075 | Matthews | Sept. 5, 1950 |
| 2,540,972 | Wagner | Feb. 6, 1951 |
| 2,576,956 | Matthews | Dec. 4, 1951 |
| 2,617,528 | Moore | Nov. 11, 1952 |